United States Patent
Pratt et al.

(10) Patent No.: US 10,127,462 B1
(45) Date of Patent: Nov. 13, 2018

(54) SYSTEMS AND METHODS FOR DETECTING MARKERS ON A ROADWAY

(71) Applicant: Toyota Research Institute, Inc., Los Altos, CA (US)

(72) Inventors: Gill A. Pratt, Los Altos Hills, CA (US); James J. Kuffner, Jr., Sunnyvale, CA (US); James M. Adler, Redwood City, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 15/590,653

(22) Filed: May 9, 2017

(51) Int. Cl.
| | |
|---|---|
| G08G 1/0967 | (2006.01) |
| G06K 9/00 | (2006.01) |
| G05D 1/00 | (2006.01) |
| B60W 30/12 | (2006.01) |
| B60W 40/06 | (2012.01) |
| G05D 1/02 | (2006.01) |

(52) U.S. Cl.
CPC ......... *G06K 9/00798* (2013.01); *B60W 30/12* (2013.01); *B60W 40/06* (2013.01); *G05D 1/0088* (2013.01); *G05D 1/0236* (2013.01); *G08G 1/096725* (2013.01); *G08G 1/096791* (2013.01)

(58) Field of Classification Search
CPC .. G06K 9/00798; B60W 30/12; B60W 40/06; G05D 1/0088; G05D 1/0236; G08G 1/096725
See application file for complete search history.

(56) References Cited

U.S. PATENT DOCUMENTS

| | | | | |
|---|---|---|---|---|
| 3,725,930 A | * | 4/1973 | Caruso, Jr. ................ | G01S 1/02 342/351 |
| 4,790,402 A | * | 12/1988 | Field ..................... | G01S 17/936 180/169 |
| 4,990,841 A | * | 2/1991 | Elder ................... | G05D 1/0263 180/168 |
| 5,202,742 A | * | 4/1993 | Frank .................... | G01S 7/4811 180/167 |
| 5,347,456 A | * | 9/1994 | Zhang .................. | G05D 1/0261 180/168 |
| 5,708,427 A | * | 1/1998 | Bush .................... | G05D 1/0261 180/168 |

(Continued)

OTHER PUBLICATIONS

IEEE post, http://spectrum.ieee.org/nanoclast/semiconductors/nanotechnology/nanoenabled-coating-makes-aircraft-invisible, Jul. 14, 2010.

*Primary Examiner* — Nay Tun
(74) *Attorney, Agent, or Firm* — Christopher G. Darrow; Darrow Mustafa PC

(57) ABSTRACT

System, methods, and other embodiments described herein relate to detecting markers on a roadway. In one embodiment, a method includes controlling a radar to transmit a scanning signal with defined characteristics. The radar is integrated with a vehicle that is traveling on the roadway. The method includes, in response to receiving a reflected signal resulting from the scanning signal interacting with the roadway, identifying the marker from the reflected signal according to an electromagnetic signature of the marker embodied in the reflected signal. The electromagnetic signature is a response induced within the defined characteristics of the scanning signal that is embodied within the reflected signal.

20 Claims, 18 Drawing Sheets

(56) References Cited

U.S. PATENT DOCUMENTS

| | | | |
|---|---|---|---|
| 5,781,119 A * | 7/1998 | Yamashita | G05D 1/024 180/168 |
| 5,853,846 A * | 12/1998 | Clark | B32B 5/16 428/131 |
| 5,875,408 A * | 2/1999 | Bendett | B62D 1/28 180/169 |
| 6,032,110 A * | 2/2000 | Ishihara | G01B 7/31 324/207.11 |
| 6,157,320 A * | 12/2000 | Yujiri | H01Q 15/08 180/167 |
| 6,336,064 B1 * | 1/2002 | Honkura | G01C 21/26 180/167 |
| 6,772,062 B2 * | 8/2004 | Lasky | G05D 1/0261 180/168 |
| 7,140,803 B2 * | 11/2006 | Cummings | E01F 9/30 404/12 |
| 8,321,067 B1 | 11/2012 | Prada Gomez et al. | |
| 8,840,956 B2 | 9/2014 | Bell et al. | |
| 8,880,273 B1 * | 11/2014 | Chatham | G06K 9/00798 701/23 |
| 9,207,373 B2 | 12/2015 | Gelfant et al. | |
| 9,278,691 B1 * | 3/2016 | Zsombory | B60W 30/12 |
| 9,399,844 B1 | 7/2016 | King | |
| 2007/0104352 A1 * | 5/2007 | Yoshiguchi | B60W 50/14 382/104 |
| 2009/0140884 A1 * | 6/2009 | Hartman | G08G 5/025 340/953 |
| 2011/0288774 A1 * | 11/2011 | Bengtsson | G08G 1/16 701/301 |
| 2012/0070227 A1 | 3/2012 | Asgari | |
| 2012/0321130 A1 * | 12/2012 | Osman | G06K 9/00 382/103 |
| 2014/0160276 A1 * | 6/2014 | Pliefke | B60R 1/00 348/118 |
| 2015/0247297 A1 | 9/2015 | Protzmann et al. | |
| 2015/0269734 A1 | 9/2015 | Lee et al. | |
| 2015/0294566 A1 * | 10/2015 | Huang | G05D 1/0261 701/41 |
| 2016/0132705 A1 | 5/2016 | Kovarik et al. | |
| 2016/0203606 A1 * | 7/2016 | Arata | G06T 7/80 348/148 |
| 2017/0372607 A1 * | 12/2017 | Janovec | G08G 1/09623 |

* cited by examiner

SYSTEMS AND METHODS FOR DETECTING MARKERS ON A ROADWAY

TECHNICAL FIELD

The subject matter described herein relates in general to systems and methods for detecting markers on a roadway and, more particularly, to using materials with highly contrasting electromagnetic properties to improve the detectability of the markers.

BACKGROUND

Autonomous vehicles, also referred to as self-driving cars, navigate autonomously through an environment with minimal or no human input. To navigate autonomously, a vehicle determines a location within an environment so that various obstacles can be avoided and to ensure that the vehicle remains on the roadway. In general, autonomous vehicles may use various sensors including, for example, cameras to help the vehicle detect and identify obstacles in the environment. Thus, by way of example, the vehicle can use the cameras to obtain images of the roadway and identify lane markers within the images. As a result, the vehicle can, for example, determine whether it is presently within and keeping a particular lane in relation to the lane markers.

However, identifying the lane markers in the described manner can present difficulties when, for example, precipitation (e.g., rain, snow, ice) is present on the roadway, when markers become worn, when visibility is poor (e.g., fog, snow), when a clear view is occluded by traffic, and so on. Moreover, identifying the lane markers as described provides information about the lane markers themselves, but does not provide additional information about the roadway or the surrounding environment.

SUMMARY

In one embodiment, example systems and methods relate to a manner of detecting markers according to a signature of the markers. For example, in order to improve the detectability of markers, in one embodiment, an electromagnetic signature of the markers is altered. That is, a response induced within a reflected signal is controlled by, for example, altering properties of the markers to cause the particular response. In one embodiment, the markers are installed within the roadway using, for example, a material that absorbs electromagnetic radiation. Accordingly, when the vehicle scans the roadway, the marker contrasts with surrounding segments because of the configured electromagnetic response of the marker. In this way, the vehicle can identify the marker on the roadway even when the roadway is, for example, covered with precipitation and/or the marker is not otherwise visible because of present environmental conditions.

In one embodiment, a detection system for detecting a marker on a roadway is disclosed. The detection system includes one or more processors and a memory that is communicably coupled to the one or more processors. The memory stores a scanning module that includes instructions that when executed by the one or more processors cause the one or more processors to control a radar to transmit a scanning signal with defined characteristics. The radar is integrated with a vehicle that is traveling on the roadway. The memory stores a detection module including instructions that when executed by the one or more processors cause the one or more processors to, in response to receiving a reflected signal resulting from the scanning signal interacting with the roadway, identify the marker from the reflected signal according to an electromagnetic signature of the marker embodied in the reflected signal. The electromagnetic signature is a response induced within the defined characteristics of the scanning signal that is embodied within the reflected signal.

In one embodiment, a non-transitory computer-readable medium is disclosed. The computer-readable medium stores instructions that when executed by one or more processors cause the one or more processors to perform the disclosed functions. The instructions include instructions to control a radar to transmit a scanning signal with defined characteristics, wherein the radar is integrated with a vehicle that is traveling on the roadway. The instructions include instructions to, in response to receiving a reflected signal resulting from the scanning signal interacting with the roadway, identify the marker from the reflected signal according to an electromagnetic signature of the marker embodied in the reflected signal. The electromagnetic signature is a response induced within the defined characteristics of the scanning signal that is embodied within the reflected signal.

In one embodiment, a method of detecting markers on a roadway is disclosed. The method includes controlling a radar to transmit a scanning signal with defined characteristics. The radar is integrated with a vehicle that is traveling on the roadway. The method includes, in response to receiving a reflected signal resulting from the scanning signal interacting with the roadway, identifying the marker from the reflected signal according to an electromagnetic signature of the marker embodied in the reflected signal. The electromagnetic signature is a response induced within the defined characteristics of the scanning signal that is embodied within the reflected signal.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
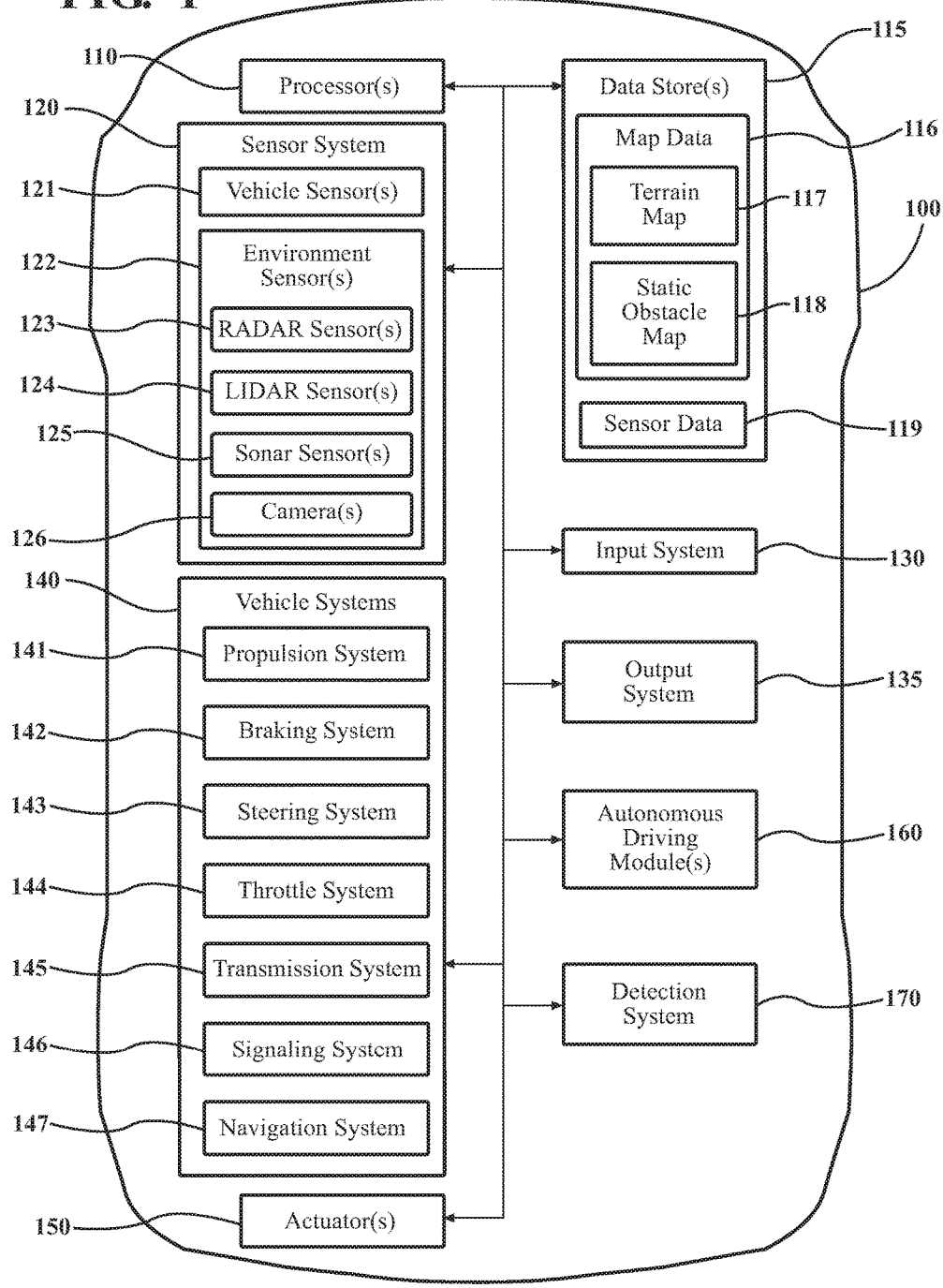
FIG. 1 illustrates one embodiment of a vehicle within which systems and methods disclosed herein may be implemented.

As mentioned in the background, locating markers on a roadway and, similarly, determining a location of a vehicle on the roadway are complex tasks. Thus, as set forth herein, multiple embodiments are disclosed relating to improving the detectability of markers on the roadway, embedding information within the roadway, and using the embedded information to facilitate localizing the vehicle on the roadway. Accordingly, as an initial matter, a general format of the markers will be discussed along with how, either additionally or alternatively, information is embedded into the roadway. After this brief initial discussion, the description will turn to describing systems, methods and other embodiments associated with detecting the markers and acquiring embedded information from the roadway by a vehicle.

As previously discussed, a vehicle can use lane markers painted onto a surface of the roadway in an attempt to visually identify lanes. These lane markers are generally applied using paint or tape that is active in the visible region of the electromagnetic spectrum. Thus, to detect the markers, camera sensors of the vehicle provide images that are then processed. However, many different circumstances can affect whether the lane markers are detected. These circumstances can include the presence of precipitation (e.g., snow, ice, rain, etc.), environmental conditions (e.g., fog, smoke, etc.), lighting conditions (e.g., sun glare, headlights from oncoming traffic, etc.), and many other circumstances. Consequently, visually identifying the markers can suffer from various difficulties.

Therefore, in one embodiment, markers of the roadway are comprised of a material that causes the markers to contrast with a surrounding surface of the roadway in, for example, a range of wavelengths within the electromagnetic spectrum that avoids the previously noted difficulties. Accordingly, the material can take on different forms depending on the particular implementation. For example, the material can have a hyper-electromagnetic reflectivity that causes electromagnetic radiation to reflect back to an emission source with minimal attenuation. In another embodiment, the material absorbs electromagnetic radiation (e.g., radar absorbing material (RAM)) by attenuating the electromagnetic radiation such that an area of the marker has a contrasting reflectivity which disperses and does not reflect radiation in comparison to the surrounding surface of the roadway. Thus, an area of the marker can be of a comparatively low reflectivity in relation to the surrounding roadway. Accordingly, by analogy a marker formed from radar absorbing materials can be characterized as a black hole for electromagnetic radiation of a particular wavelength or range of wavelengths. Still, in a further embodiment, the marker can be comprised of a combination of hyper-reflective material and radar absorbing material forming a pattern that defines a binary relationship of electromagnetic reflectivities within the marker, which are both distinguished from the surrounding surface of the roadway.

In one embodiment, the materials that comprise the marker induce a response within a particular portion of the electromagnetic spectrum that relates to radar signals. Thus, the materials can induce a response in electromagnetic radiation having, for example, a wavelength of about 2.7 mm to about 100 m. However, in one embodiment, the materials are generally focused on inducing a response in the centimeter to millimeter wavelength bands as may be implemented with a radar integrated into a vehicle. While the response is generally discussed in relation to the electromagnetic reflectivity of the material, in one embodiment, the material induces a shift in phase, wavelength, and/or polarity according to a defined amount between a scanning signal and a reflected signal. In either case, a wavelength of the scanning signal produced by the radar is generally unaffected by precipitation or other forms of atmospheric moisture that can affect visible light. Thus, providing the markers formed from the noted materials along with configuring the vehicle to scan for the markers using the noted wavelengths can improve a detectability of the markers while avoiding the noted difficulties.

Moreover, in one embodiment, as noted, a pattern can be provided within the marker or separately in the roadway in either a structured (e.g., a bar code) or an unstructured (e.g., randomized fingerprint) to embed information in the roadway. While roadway markers are generally discussed, various embodiments disclosed herein encompass using the noted materials to embed information within the roadway outside of the confines of the markers themselves. That is, for example, the materials can be applied within a lane between lane markers, interspersed between lane markers and/or other traffic markers, and so on. As an additional matter, in general, the material has a neutral coloring in the visible spectrum and thus blends with the markers or the roadway when separate from the markers. Furthermore, when combined with the markers, the material may be colored in a similar fashion as the marker to blend with the marker. Accordingly, the material can be applied to the roadway in many different configurations to facilitate marking and localization on the roadway.

To review the marker composition in a broad context, the general approach is to form the markers and/or the patterns within the roadway from a material (e.g., paint, tape, aggregate, etc.) that significantly contrasts with surrounding surfaces in relation to electromagnetic reflectivity within non-visible portions of the electromagnetic spectrum. In this way, the vehicle can detect and use the various markings for identifying lanes and acquiring information about the roadway when the roadway is covered with precipitation and/or when conditions are otherwise averse to visually detecting the markers. Thus, using the noted materials to supplement the markers and/or to embed additional information in the roadway is a robust approach that overcomes the noted difficulties.

Additional aspects of the markers and the roadway signature will be discussed along with the provided embodiments of the vehicle. Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of powered transport that, for example, includes a radar sensor and thus benefits from detecting the materials in the roadway as discussed herein.

The vehicle 100 also includes various elements. It will be understood that in various embodiments it may not be necessary for the vehicle 100 to have all of the elements shown in FIG. 1. The vehicle 100 can have different combinations of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Additionally, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-18 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a detection system 170 that is implemented to perform methods and other functions as disclosed herein relating to, for example, detecting markers on a roadway and/or to detecting patterns of electromagnetic responsive material embedded within the roadway. The noted functions and methods will become more apparent with a further discussion of the figures.

Figure 2:
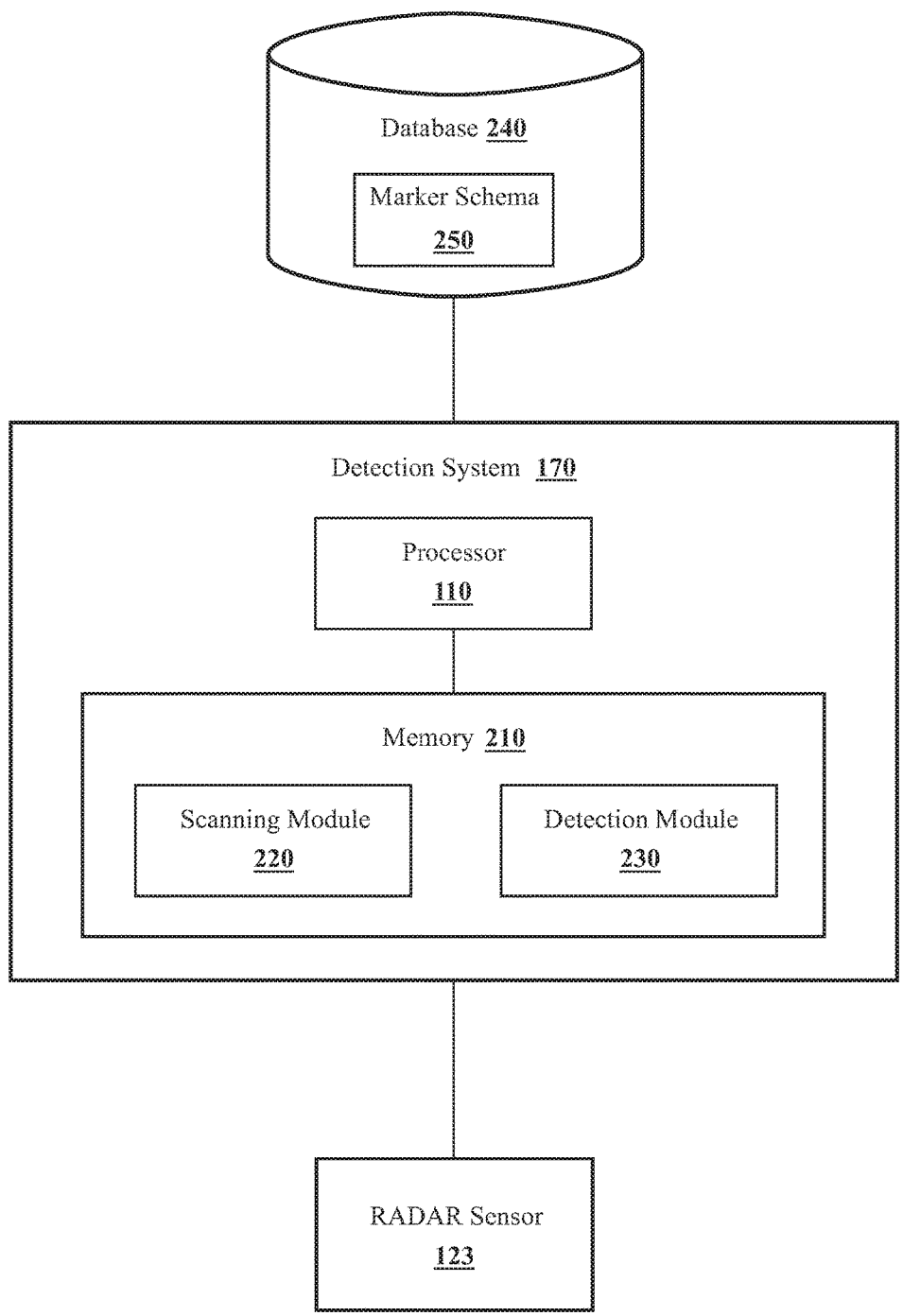
FIG. 2 illustrates one embodiment of a detection system that is associated with detecting a marker on a roadway.

With reference to FIG. 2, one embodiment of the detection system 170 of FIG. 1 is further illustrated. The detection system 170 is shown as including a processor 110 from the vehicle 100 of FIG. 1. Accordingly, the processor 110 may be a part of the detection system 170, the detection system 170 may include a separate processor from the processor 110 of the vehicle 100, or the detection system 170 may access the processor 110 through a data bus or another communication path. In one embodiment, the detection system 170 includes a memory 210 that stores a scanning module 220 and a detection module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

Accordingly, the scanning module 220 generally includes instructions that function to control the processor 110 to retrieve data from sensors of a sensor system 120. In other words, the scanning module 220 includes instructions to acquire data from a radar sensor 123, a LIDAR sensor 124, a camera 126, and so on. In one embodiment, the scanning module 220 functions to control the radar sensor 123 to scan a current location/environment using a scanning signal which interacts with surfaces in the environment to produce a reflected signal that the radar sensor 123 receives. In general, the radar sensor 123 is configured to emit the scanning signal with defined characteristics. For example, the radar sensor 123 generates the scanning signal with a defined wavelength, frequency, intensity, and polarity.

Consequently, the scanning module 220 can use the reflected signal to determine characteristics of the surface (e.g., the roadway) according to a wavelength, frequency, intensity, and polarity of the reflected signal that specifically relate to the scanning signal. While four separate characteristics of the scanning signal and the reflected signal are generally described, it should be appreciated that fewer characteristics (e.g., intensity alone) may be analyzed to determine aspects of the roadway. In either case, the characteristics of the reflected signal embody properties of the roadway in how those properties differ from the original scanning signal.

By way of example, when the scanning module 220 controls the radar sensor 123 to scan the roadway for a marker that is comprised of radar absorbing material, the detection module 230 analyzes properties of a resulting reflected signal for changes in the intensity in comparison to the scanning signal and also in comparison to reflected signals from surrounding segments of the roadway. In this way, the detection module 230 can distinguish the marker from the surrounding roadway even when the roadway is covered in precipitation.

Furthermore, the radar sensor 123 itself can be implemented in several different forms. In one embodiment, the radar sensor 123 is a forward-facing radar located in a front grill, front bumper, or other forward-facing portion of the vehicle 100. Additionally, in one embodiment, the radar sensor 123 is provided for purposes such as detecting other vehicles/obstacles, for active cruise control (ACC), and/or for collision avoidance systems. Thus, in one embodiment, the detection system 170 sniffs or otherwise passively obtains information from the radar sensor 123. In other embodiments, the radar sensor 123 is a dedicated device of the detection system 170.

Additionally, the radar sensor 123 is, in one embodiment, an array of radar sensors. Thus, the array of radar sensors may include side-facing sensors, forward-facing sensors, rear-facing sensors, and so on. Alternatively, or additionally, in one embodiment, the radar sensor 123 includes a set of radar sensors (e.g., one, two, three, or more) that are directed to a surface of the roadway and are attached to an underside of the vehicle 100. Further aspects of the radar sensor 123 will be discussed along with particular embodiments subsequently. However, it should be appreciated that a particular form and arrangement of the radar sensor 123 may vary depending on aspects of the specified embodiment.

In either case, the scanning module 220, in one embodiment, continuously receives reflected signals from the roadway as the vehicle 100 progresses along a path. Thus, the scanning module 220 is, in one embodiment, continuously, or, at least semi-continuously scanning the roadway. In alternative embodiments, the scanning module 220 selectively scans the roadway at regular intervals (e.g., every 0.1 seconds). In either case, the scanning module 220 scans the roadway and provides reflected signals as a result of the scanning.

In one embodiment, the detection module 230 generally includes instructions that function to control the processor 110 to analyze the reflected signals for an electromagnetic signature that correlates with a marker on the roadway. As previously noted, the electromagnetic signature is the distinct response produced in the reflected signal by the marker on the roadway. Thus, the detection module 230, in one embodiment, continuously monitors for indicators of the electromagnetic signature within the received reflected signals (e.g., phase shift, intensity shift, etc.). It should be noted, that in an instance where the marker is characterized by attenuating the scanning signal and thus not producing the reflected signal because the scanning signal is otherwise dispersed or dissipated, the detection module 230 monitors for an absence of the reflected signal over an area of the marker and a presence of the reflected signal in adjacent areas.

Accordingly, in one embodiment, the detection module 230 generates a matrix of surface reflectivities according to a coordinate system relative to the roadway. Consequently, the detection module 230 can score grid locations within the matrix according to intensity levels of reflected signals. Subsequently, the detection module 230 compares adjacent cells of the matrix in order to identify contrasting cells and detect the markers. Moreover, the detection module 230 can also identify embedded codes (e.g., barcodes) in this manner by identifying a pattern within the matrix that corresponds to an embedded code.

Accordingly, in one embodiment, the detection system 170 includes the database 240. The database 240 is, in one embodiment, an electronic data structure stored in the memory 210 or another data store and that is configured with routines that can be executed by the processor 110 for analyzing stored data, providing stored data, organizing stored data, and so on. Thus, in one embodiment, the database 240 stores data used by the modules 220 and 230 in executing various functions. In one embodiment, the database 240 includes a marker schema 250. The marker schema 250 stores, for example, information for decoding embedded barcodes, identifying various types of markers (e.g., lane markers, traffic markers, etc.) according to shapes and locations within the roadway, and so on.

Figure 3:
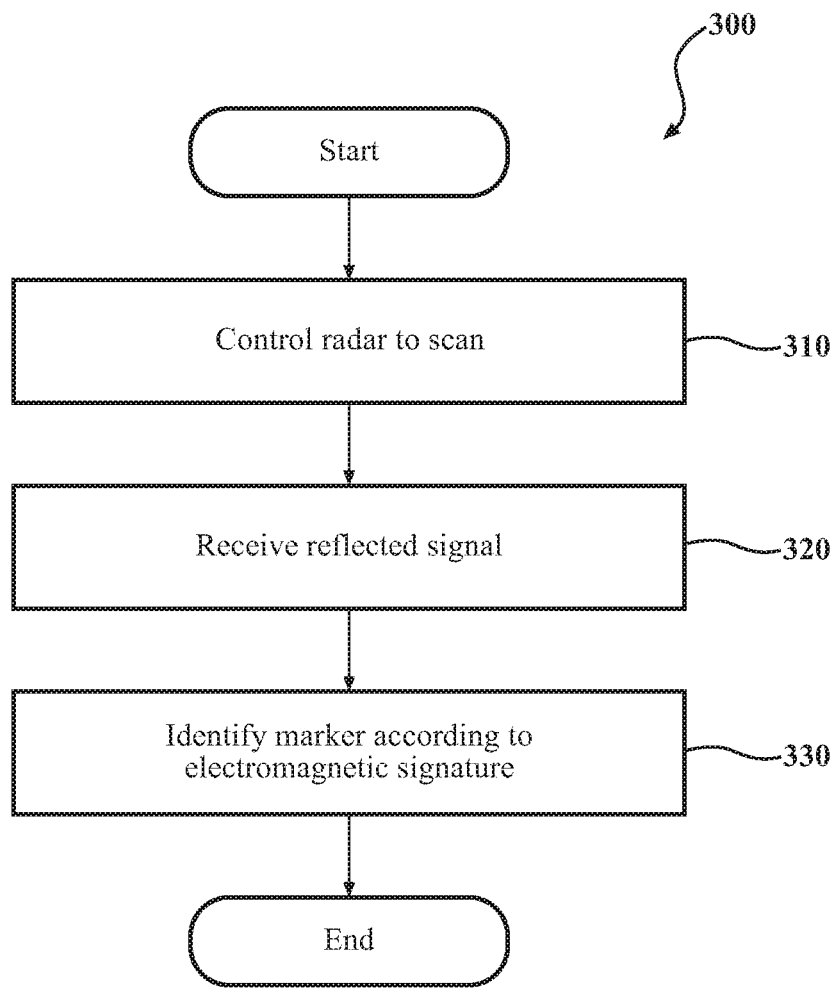
FIG. 3 illustrates one embodiment of a method that is associated with identifying a marker on a roadway.

Additional aspects of identifying markers will be discussed in relation to FIG. 3. FIG. 3 illustrates a flowchart of a method 300 that is associated with using a radar to detect markers on a roadway. Method 300 will be discussed from the perspective of the detection system 170 of FIGS. 1 and 2. While method 300 is discussed in combination with the detection system 170, it should be appreciated that the method 300 is not limited to being implemented within the detection system 170, but is instead one example of a system that may implement the method 300.

At 310, the scanning module 220 controls a radar to transmit a scanning signal with defined characteristics. In one embodiment, the scanning module 220 actively controls the radar sensor 123 to transmit the scanning signal. As previously mentioned, the scanning signal is generated according to the defined characteristics in order to, for example, provide the detection module 230 with the ability to measure changes to the scanning signal as embodied by the reflected signal.

Moreover, while a single scanning signal is discussed, in one embodiment, the scanning module 220 can control the radar sensor 123 to generate scanning signals with different defined characteristics and/or multiple sub-sensors of a sensor array that comprises the radar sensor 123 to simultaneously generate scanning signals. The scanning module 220 may use scanning signals with different defined characteristics according to, for example, different environmental conditions. That is, the scanning module 220 can select different intensities, wavelengths and so on to optimize the scanning for different conditions, such as when precipitation is present. Because atmospheric moisture can attenuate certain wavelengths of electromagnetic radiation, the scanning module 220 may select a wavelength of the scanning signal when rain, snow, or ice are detected that does not experience interference or experiences minimal interference from the moisture. In this way, the detection system 170 can detect the marker when visible detection approaches would be otherwise ineffective.

Additionally, the scanning module 220, in one embodiment, scans an area of the roadway where the marker is expected to be located. Alternatively, in another embodiment, the scanning module 220 continuously scans across a width of the roadway that is covered by the radar sensor 123. In either case, the scanning module 220 can scan a horizontal dimension (e.g., width) of the roadway in addition to a longitudinal dimension as the vehicle 100 progresses along a path on the roadway. In this way, the scanning module 220 can detect the marker when the vehicle 100 is off-center within the lane and also when markers are present within the lane itself as opposed to being at an edge of the lane.

At 320, the scanning module 220 receives a reflected signal resulting from the scanning signal interacting with the roadway. As previously noted, the marker is configured with one or more materials that induce a response in the scanning signal to produce the reflected signal with properties that are indicative of the presence of the marker. Thus, the reflected signal represents a modified form of the scanning signal and embodies properties of whatever surface reflected the scanning signal. Accordingly, the marker modifies characteristics of the scanning signal to produce the reflected signal. Thus, as previously mentioned, the reflected signal may be transformed in comparison to the scanning signal through a shift in phase (i.e., a temporal shift), a shift in intensity (e.g., a reduction from radar absorbing material), and so on. In either case, the scanning module 220 acquires the detected characteristics of the reflected signal and communicates the reflected signal to the detection module 230 over a data bus or other communication pathway for further processing.

At 330, the detection module 230 identifies the marker from the reflected signal. In one embodiment, the detection module 230 monitors reflected signals for an electromagnetic signature that is indicative of the marker as the reflected signals are received. As previously noted, the markers may be configured using different materials and may be encoded with various patterns to convey more detailed information. Thus, the detection module 230 can monitor for multiple different electromagnetic signatures as defined by the marker schema 250. As an example, the reflectivity of sequential markers may be alternated between hyper-reflective and highly dispersing in a particular pattern/order (e.g., morse code) to convey information in a binary format. Moreover, in one embodiment, the markers may be configured with various degrees of reflectivity to implement a ternary system for conveying information or a system of a higher granularity depending on a resolution of the radar sensor 123. Whichever particular system is implemented, the detection module 230 identifies the markers according to the distinct electromagnetic signature.

Figure 4:
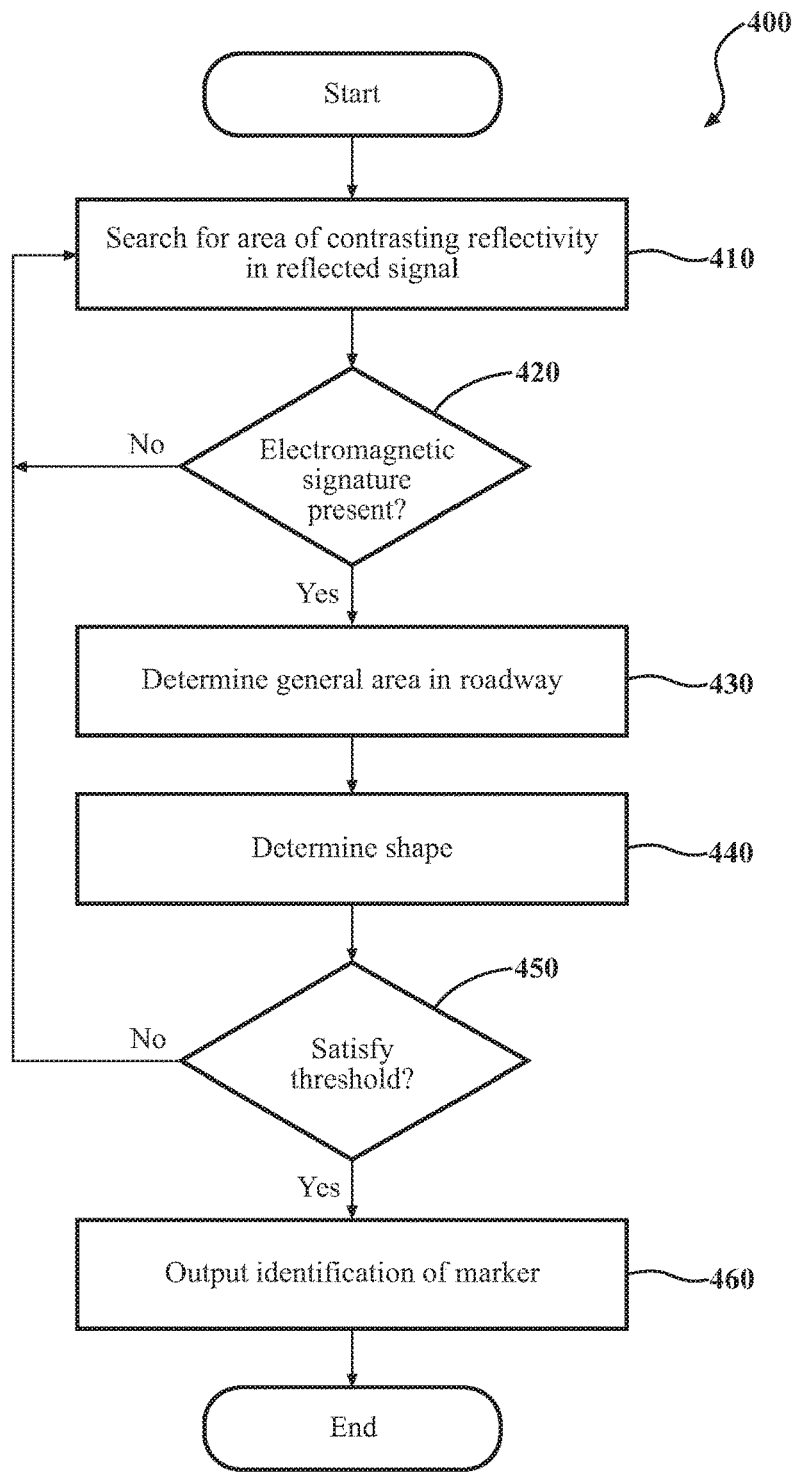
FIG. 4 illustrates one embodiment of a method associated with scanning a roadway for a marker.

Additional details about how the detection module 230 identifies the marker will be discussed in relation to FIG. 4. FIG. 4 illustrates a flowchart of a method 400 that is associated with analyzing reflected signals to identify markers in a roadway. Method 400 will be discussed from the perspective of the detection system 170 of FIGS. 1 and 2. While method 400 is discussed in combination with the detection system 170, it should be appreciated that the method 400 is not limited to being implemented within the detection system 170, but is instead one example of a system that may implement the method 400. Moreover, as previously indicated, method 400 is a further detailed illustration of block 330 from FIG. 3. Thus, for purposes of the subsequent discussion aspects relating to scanning the roadway and receiving the reflected signal are referenced in relation to blocks 310 and 320 of method 300. As an additional note, in various embodiments, the method 400 may be implemented with a portion of the blocks described along with FIG. 4. However, a comprehensive discussion of different aspects of the method 400 is provided to illustrate options for identifying the marker in a wide scope.

At 410, the detection module 230 searches for indicators of the marker in the reflected signal. In one embodiment, the detection module 230 searches for the electromagnetic signature of the marker by, for example, comparing characteristics (e.g., detected intensity) against a detection threshold. The detection threshold defines a value for the specified characteristic(s) for which the marker is likely present. Thus, the detection module 230 parses or otherwise analyzes incoming data about reflected signals from the roadway to identify particular intensity values, polarities, wavelengths, and/or other characteristics. In general, the marker schema 250 can be defined as a policy or template for various types of markers and which values satisfy the detection threshold to trigger a detection or further processing.

For example, the marker schema 250, in one embodiment, defines correlations between different markers and characteristics of the different markers. Thus, for each different type of marker, the marker schema 250 can specify a detection threshold, an electromagnetic signature, a shape of the marker, an area on the roadway where the maker is likely located, and/or other information about the maker.

Thus, for a marker that is characterized by a low reflectivity from the presence of radar absorbing material within the marker, the marker schema 250 can define a contrasting region in the roadway that is characterized by a highly contrasting reflectivity in comparison to surrounding sections of the roadway as an indicator. Thus, the detection module 230 searches for the marker by detecting relatively low-intensity values in the reflected signal proximate to average or expected intensity values. By contrast, for a marker that is characterized by a phase shift, the schema 250 can specify a phase region in the roadway that is characterized by a defined phase shift relative to the defined characteristics of the scanning signal. Thus, in the example of the phase region, the detection module 230 searches for a particular phase value within the reflected signal.

Moreover, while electromagnetic signatures of the markers have been discussed, in one embodiment, the embedded signatures are geometric patterns that are embodied as physical ridges of, for example, variable thickness and spacing which produce unique characteristics within the reflected signals. Accordingly, the marker schema 250 can specify a wide range of types for the markers along with metadata used by the detection module 230 for detecting the markers.

At 420, the detection module 230 determines whether the electromagnetic signature is present in the reflected signal. In one embodiment, the detection module 230 undertakes a deeper analysis of the reflected signal at 420 as triggered by an initial superficial detection at 410. That is, the detection module 230, for example, determines whether values (e.g., intensity values) of the reflected signal match the electronic signature specified by the marker schema 250.

If the values do not correlate, then the detection module 230 proceeds to continue searching as discussed in relation to block 410. However, if the detection module 230 determines that there is a match, then the detection module 230 proceeds by determining further aspects of the marker at 430 and 440.

At 430, the detection module 230 determines a location of the marker within the roadway. In one embodiment, the detection module 230 locates the marker in relation to relative segments of the roadway to, for example, identify a type of the marker. That is, the detection module 230 can further infer information about the marker by determining if the marker is located at an edge of the roadway, within a lane of the roadway, between lanes, and so on. For example, when the marker is characterized by a contrasting region of reflectivity in the roadway, the detection module 230 analyzes the reflected signal to determine whether the contrasting region aligns with expected marker locations for an inside lane marker (e.g., lane divider or centerline), an outside lane marker (e.g., roadway edge marker), a traffic marker within a lane (e.g., lane restriction identifiers), and so on. In this way, the detection module 230 can determine aspects of the lane markers beyond simply identifying a presence of the markers.

At 440, the detection module 230 determines a shape of the marker. In one embodiment, the detection module 230 determines the shape in order to confirm the type of the marker. For example, the detection module 230 can outline the region associated with the marker as identified from the reflected signal(s). Thus, when the marker is characterized by the contrasting region, the detection module 230 outlines the contrasting region to determine the shape or at least a general shape of the marker. Because the marker may include imperfections from wear, damage, the presence of foreign objects, or other circumstances, the detection module 230 can compare the generated outline with shapes of known types of markers as defined by the marker schema 250. This comparison can correlate the marker with a particular type of marker according to, for example, a confidence interval depending on how closely the outline conforms to the defined shape. In this way, the detection module 230 can further correlate the marker with a particular defined type. Additionally, in further embodiments, where the marker includes an embedded barcode or other embedded information, the detection module 230 outlines the contrasting regions to identify and retrieve the barcode from the marker.

At 450, the detection module 230 determines whether the marker satisfies a threshold for identifying the marker. In one embodiment, the detection module 230 determines whether the determined shape, the location, and/or the detected electromagnetic signature satisfy a marker threshold that indicates a confidence interval for accepting the marker as being validly identified. In other words, the detection module 230 verifies whether the detected aspects of the marker correlate with a known type of marker in order to filter out errant anomalies in the roadway. Thus, if the detected aspects do not sufficiently satisfy the marker threshold (e.g., >85% correlation), then the detection module 230 proceeds with searching for markers as discussed at block 410. However, if the shape, location, and electromagnetic signature do correlate with a known type of marker and thus satisfy the marker threshold, then the detection module 230 outputs a positive identification of the marker at 460. While the shape, location, and electromagnetic signature are discussed as factors used by the detection module 230 for determining the presence of the marker, in various embodiments, one or more of the described factors may be omitted and/or other factors may be used by the detection module 230 when assessing the marker.

Additionally, in one embodiment, at 460, the detection module 230 outputs a location and identifier of the marker to, for example, an autonomous driving module 160 or other component of the vehicle 100 in order to provide a notification about the marker. The autonomous driving module 160 can use the identified marker to, for example, facilitate controlling the vehicle 100 and maintaining a current lane.

In further embodiments, at 460, the detection module 230 decodes the embedded information from the marker and provides the embedded information. For example, as part of determining the shape, at 440, the detection module 230 can identify an embedded barcode, QR code, binary code, ternary code, or other form of encoding within the marker or between multiple markers. Further aspects of identifying the encoding will be discussed subsequently. However, it should be appreciated that the marker can be configured with different encodings by selectively locating the materials with the particular electromagnetic signatures within the marker. That is, areas that produce the reflected signal with the particular electromagnetic signatures can be selectively applied to the marker to embed codes within the marker.

Thus, the detection module 230 can extract the codes from the marker(s) as part of, for example, determining the electromagnetic signature at 420 and the shape at 440. A resulting output of the detection module 230 is the roadway code, which can then be decoded using, for example, techniques for reading barcodes. Thus, the detection module 230 uses the output or an identifier (e.g., alpha-numeric value) of the output to lookup information about the roadway or information associated with a present location. In one embodiment, the detection module 230 references the marker schema 250 using the decoded identifier from the marker to obtain information about upcoming roadway features, a current geospatial location, or other information that may be desirable to convey through the marker.

Figure 5:
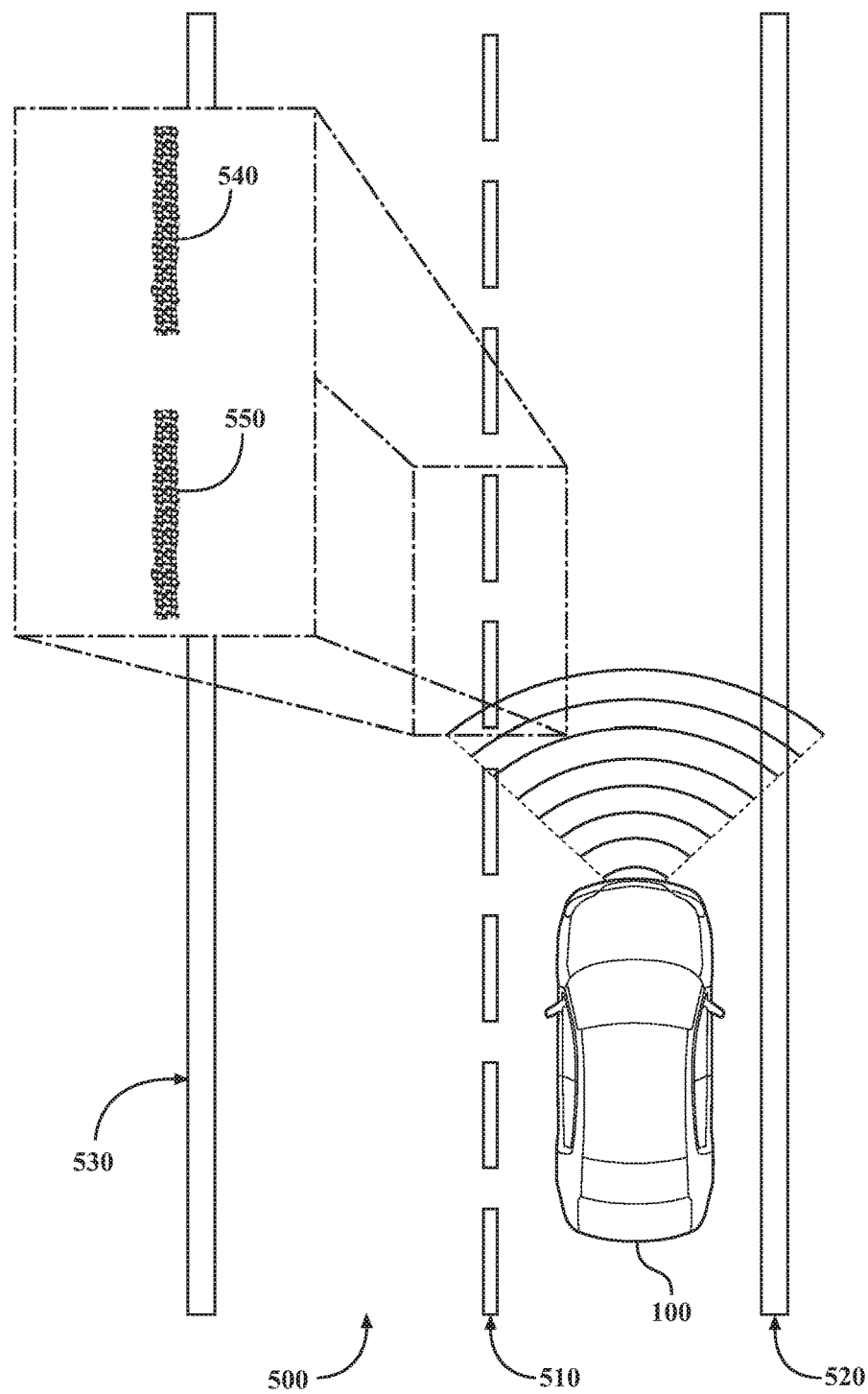
FIG. 5 illustrates an overhead view of a roadway that includes markers with an electromagnetic signature that contrasts with the surrounding surface of the roadway.

As further explanation of the markers, FIG. 5 illustrates a roadway 500 that is illustrated with lane markers 510, 520, and 530. The marker 510 is a centerline lane dividing marker. The markers 520 and 530 are edge markers for the roadway 500. As illustrated in FIG. 5, the vehicle 100 is traveling along a path within a right lane and the detection system 170 is controlling the radar sensor 123 to scan the roadway 500 for markers. Thus, all three of the markers 510, 520, and 530 can be provided with electromagnetic signatures and/or geometric signatures; however, the centerline 510 will be the present focus.

Accordingly, a magnified view of two of the centerline markers 510 is shown with markers 540 and 550 to better illustrate a general composition of the markers 510. As illustrated, the markers 510 are comprised of radar absorbing material (RAM) or another material that generally disperses radar signals without returning the signals to a source. Thus, the overall view of the roadway 500 can be considered a visible light view where the markers 510, 520, and 530 may appear as common lane markers. However, the magnified view of the markers 540 and 550 is illustrated in a non-visible portion of the electromagnetic spectrum to highlight contrasting regions of the markers in comparison to a surface of the roadway 500. That is, the markers 540 and 550 generally disperse electromagnetic radiation in a 25 GHz frequency band. Thus, as shown in FIG. 5 internal regions of the markers 540 and 550 do not reflect radar signals of the indicated frequency or reflect signals with a reduced intensity. Consequently, the markers 540 and 550 appear to be dark in color in comparison to surrounding segments of the roadway 500. This high contrast configuration within the specified radar band means that the vehicle 100 can scan the roadway 500 and detect the markers 510 by identifying the contrasting regions. While not specifically illustrated, the markers 520 and 530 may also provide a similar response as the markers 510 in relation to the scanning radar sensor 123 of the vehicle 100.

Figure 6:
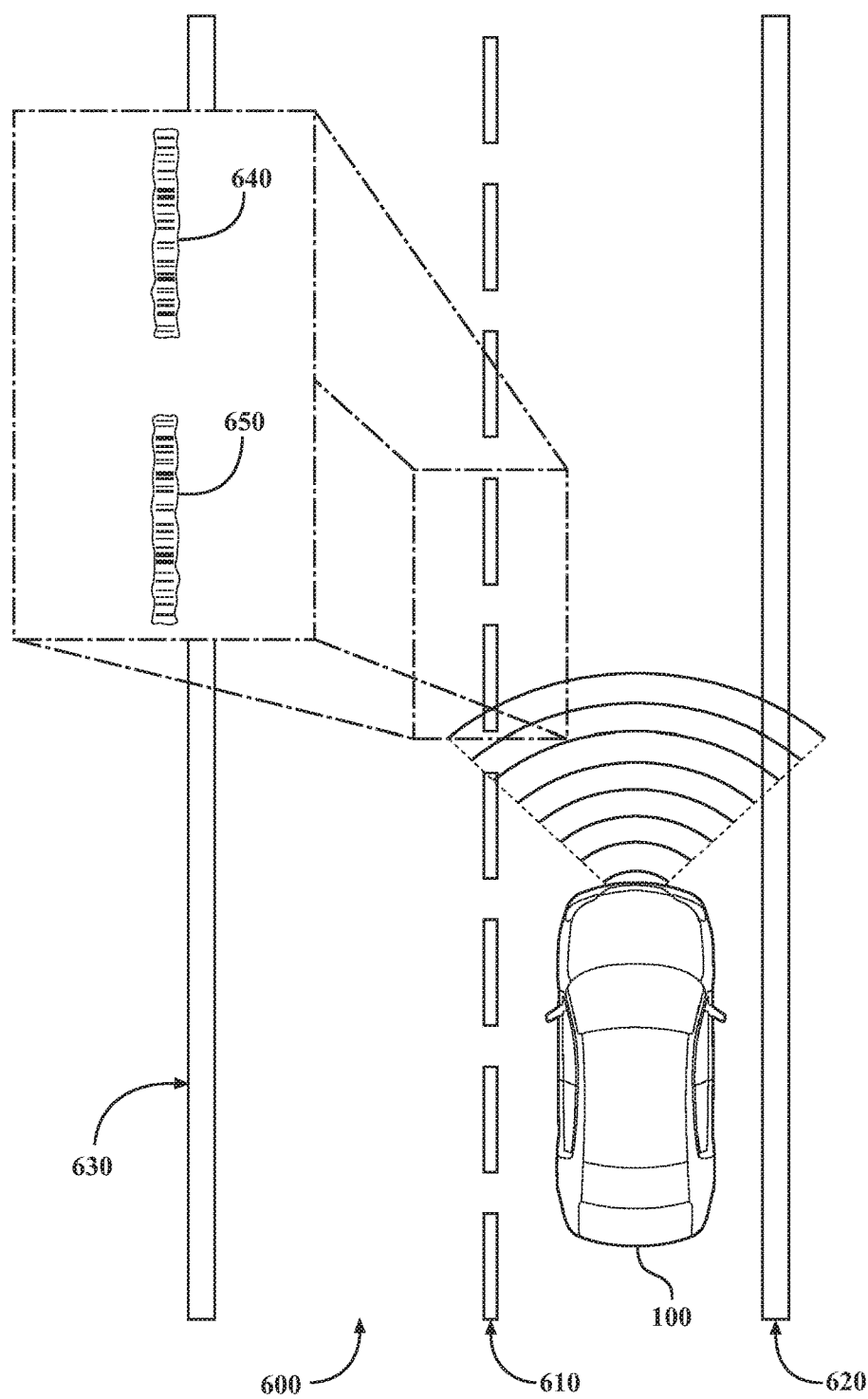
FIG. 6 illustrates another overhead view of a roadway that includes markers with embedded codes.

FIG. 6 illustrates a similar configuration as FIG. 5. For example, FIG. 6 illustrates markers 610, 620, and 630 on a roadway 600 with a similar configuration to FIG. 5. However, upon further inspection of electromagnetic responses provided when scanning the markers 640 and 650, embedded barcodes become evident. That is, the centerline markers 640 and 650 of FIG. 6 include embedded barcodes. Thus, as the detection system 170 scans the roadway 600 using the radar sensor 123, the reflected signals received from the markers 640 and 650 can be used to reconstruct the shape of the barcodes embedded using the radar absorbing materials in the markers 640 and 650. The detection module 230 can then decode the barcodes to obtain information about the roadway 600 or upcoming features (e.g., traffic patterns, traffic signs, etc.) of the roadway 600. It should be noted that, while the centerline markers 640 and 650 are illustrated as including the barcodes, in other embodiments, the barcodes may take different forms (e.g., QR codes, APRIL tags, etc.) and/or may be embodied within different markers such as the edge markers 620 and 630, embedded within a center area of the lane without an associated visible marker, embedded in fewer or more of the centerline markers 610, and so on. In general, the electromagnetic signature and codes formed from selectively placing the electromagnetic signatures can be embedded within the roadway 600 at any desired location.

Figure 7:
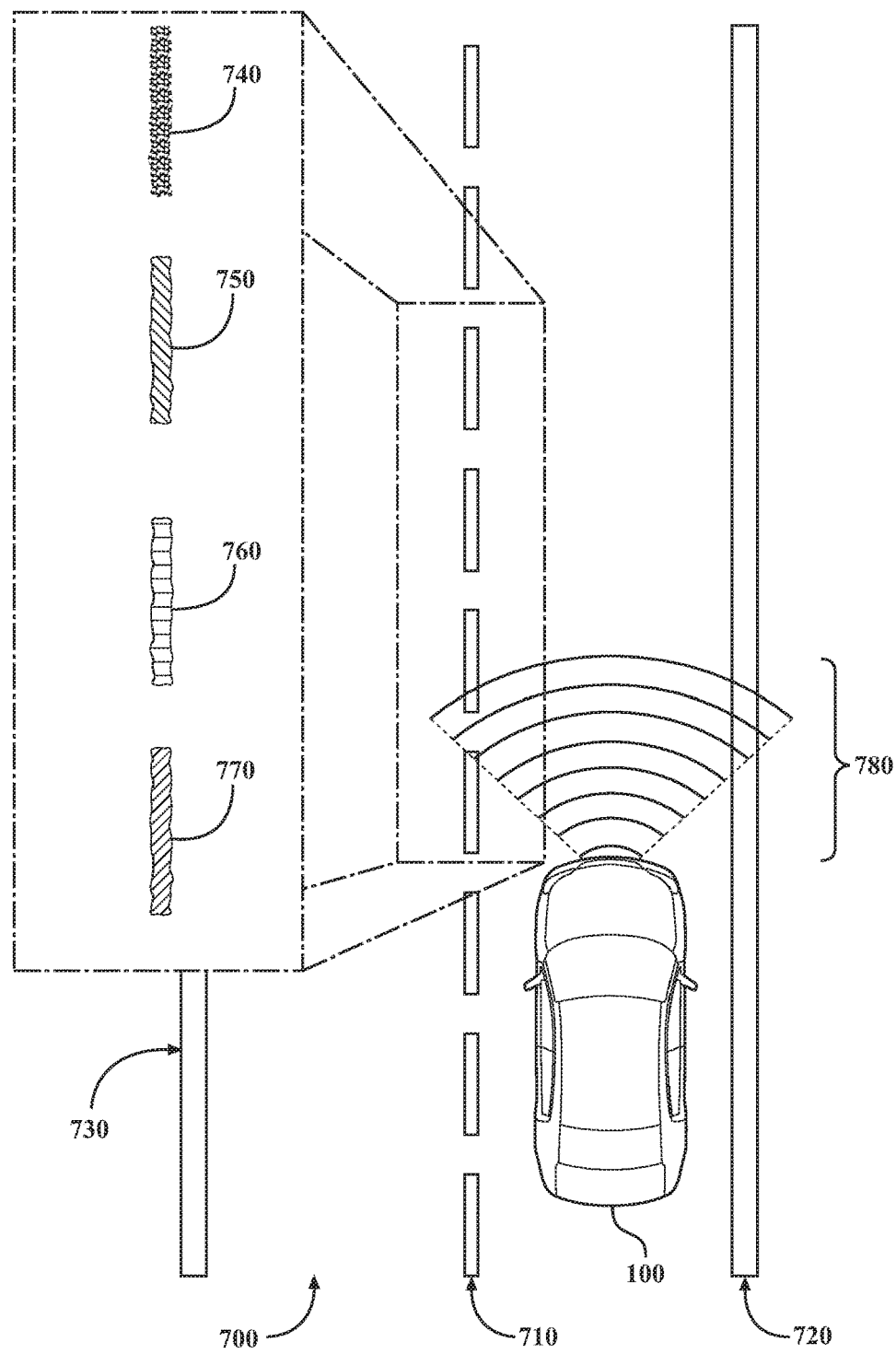
FIG. 7 illustrates an overhead view of a roadway with markers having differing electromagnetic characteristics from the surrounding surface of the roadway.

FIG. 7 illustrates a further embodiment of how the markers on a roadway 700 can be implemented and detected by the vehicle 100. For example, as illustrated, the roadway 700 includes a similar configuration of visible markers as FIGS. 5 and 6. That is, the roadway 700 includes centerline markers 710, and edge markers 720 and 730. The vehicle 100 is traveling along a path and is scanning the roadway 700 using a scanning signal(s) 780. As illustrated in FIG. 7, markers 740, 750, 760, and 770 are provided in a magnified view and according to a response provided by those markers when reflecting the signals 780. The signals 780 are generally radar signals that are provided in a radar frequency band (e.g., 25 GHz) of the electromagnetic spectrum.

Accordingly, the illustrated responses of the markers 740, 750, 760, and 770 illustrate different electromagnetic signatures that may be implemented separately or in various combinations between the markers 710. Moreover, different signatures may be implemented in the markers depending on a type of the marker. That is, for example, the markers 730 may be implemented using a first electromagnetic signature, the markers 720 may be implemented according to a second electromagnetic signature, the markers 710 may be implemented according to a third electromagnetic signature, and so on. Thus, the different types of markers may correlate with separate electromagnetic signatures according to the type. As an additional note, the electromagnetic signatures in the markers may be implemented in a continuous manner where the marker is a solid line or, in alternative embodiments, may be varied according to, for example, changing aspects of the roadway.

In either case, different electromagnetic signatures can be encoded in different dashes of the markers 710 or in segments of the markers of the markers 720 and 730, as a manner of, for example, encoding information using a binary code, a ternary code, or another resolution of code. In one embodiment, the separate forms of electromagnetic signatures are used to embed a Morse code between dashes, an opcode such as that used by a computer processor, and so on. As illustrated in FIG. 7, the marker 740 has a low-reflectivity signature, marker 750 has a phase shift signature, the marker 760 has a high-reflectivity signature, and the marker 770 has a different phase shift signature than the marker 750. Accordingly, as illustrated, the markers have four separate options for electromagnetic signatures. However, it should be appreciated that separate granularities of reflectivity can also be implemented and can be implemented in combination with further aspects such as phase shifts to provide a range of possible electromagnetic signatures for the markers. In this way, different markers can be encoded using different electromagnetic signatures and/or different signatures can be implemented between or within markers to embed codes. Consequently, the detection system 170 can acquire information (e.g., roadway information, navigation information, location information, etc.) from the encoded markers as the vehicle 100 travels along the roadway.

Roadway Signature

Figure 8:
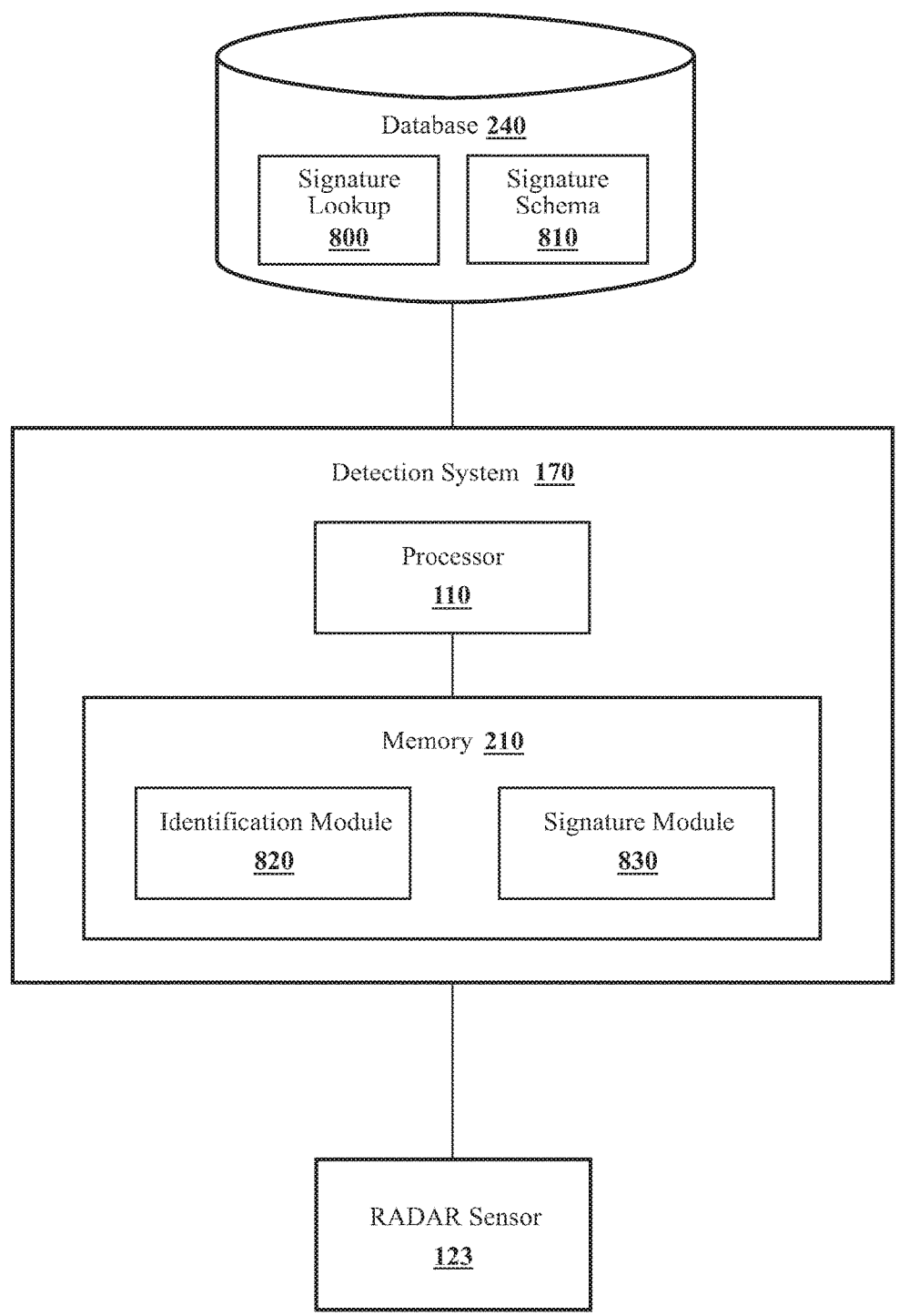
FIG. 8 illustrates one embodiment of a detection system that is associated with identifying a roadway signature.

With reference to FIG. 8, an alternative embodiment of the detection system 170 of FIGS. 1 and 2 is illustrated. As illustrated in FIG. 8, the detection system 170 includes elements similar to those discussed in relation to FIG. 2; however, a general configuration of the elements may differ. For example, the database 240, in FIG. 8, is illustrated as storing a signature lookup 800 and a signature schema 810. It should be noted that while the database 240 is not illustrated as including the marker schema 250 in FIG. 8, in various embodiments, the database 240 may still include the marker schema 250 in addition to the signature lookup 800 and the signature schema 810. Moreover, in FIG. 8, the detection system 170 is illustrated as including an identification module 820 and a signature module 830. In various embodiments, the modules 820 and 830 can include elements similar to the modules 220 and 230 in addition to further aspects as discussed in relation to FIG. 8.

Moreover, in FIG. 8, the detection system 170 is shown as including the processor 110 from the vehicle 100 of FIG. 1. Accordingly, as previously noted, the processor 110 may be a part of the detection system 170, the detection system 170 may include a separate processor from the processor 110 of the vehicle 100, or the detection system 170 may access the processor 110 through a data bus or another communication path. In one embodiment, the detection system 170 includes the memory 210 that stores the identification module 820 and the signature module 830. The modules 820 and 830 are, for example, computer-readable instructions that when executed by the processor 110 cause the processor 110 to perform the various functions disclosed herein. Accordingly, the identification module 820 generally includes instructions that function to control the processor 110 to retrieve data from sensors of the sensor system 120 in a similar manner as discussed in relation to the scanning module 220 of FIG. 2. That is, the identification module 820, in one embodiment, controls the radar sensor 123 to transmit a scanning signal and to receive a reflected signal resulting from the scanning signal reflecting from surfaces in a surrounding environment.

Figure 9:
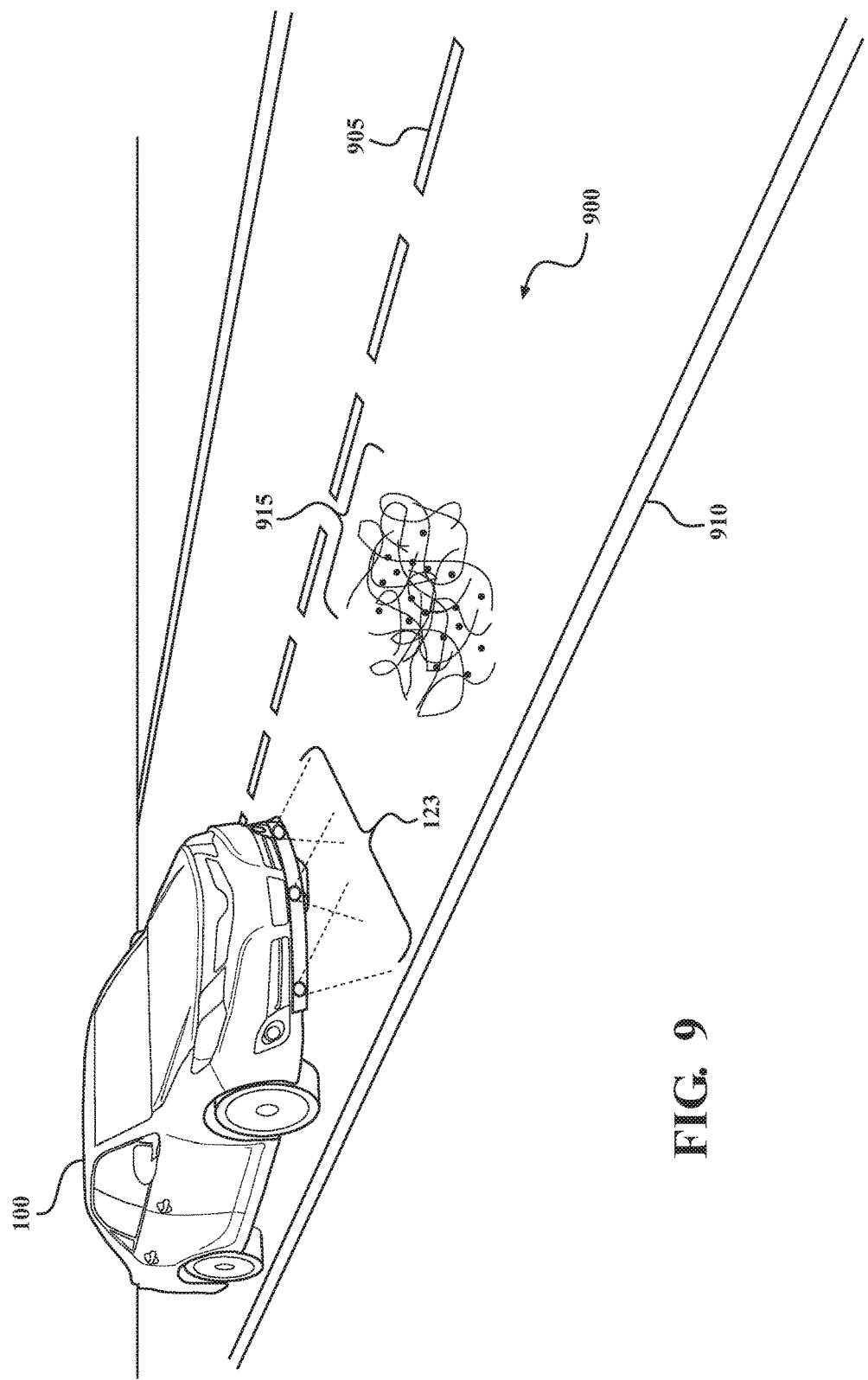
FIG. 9 illustrates a schematic of a vehicle equipped with an array of radar sensors.

As a brief explanation of one example configuration of the radar sensor 123, consider FIG. 9. FIG. 9 illustrates a view of a roadway 900 with the vehicle 100 traveling within a lane. The lane is defined in the roadway 900 by a centerline marker 905 and an edge marker 910. The radar sensor 123 is illustrated as being attached to an undercarriage of the vehicle 100 in an area between or forward of front wheels of the vehicle 100. In the illustrated embodiment, the radar sensor 123 is comprised of an array of three separate sensors that each individually transmit and receive electromagnetic radiation with a wavelength within a radar band of the electromagnetic spectrum. For example, the wavelength may be a centimeter-wavelength, a millimeter-wavelength or another wavelength of radiation that is suitable for scanning the roadway 900. Additionally, while three sensors are illustrated, in various implementations, the array can be comprised of more sensor or fewer sensors. For example, in one embodiment, more sensors (e.g., 5 sensors) may be provided to increase a resolution of information obtained from a surface of the roadway. In either case, the radar sensor 123 is, in one embodiment, controlled by the identification module 820 to scan for signatures within the roadway such as roadway signature 915.

Further description of the roadway signature 915 and other roadway signatures will now be provided before proceeding with the discussion of FIG. 8. Accordingly, a roadway signature is, in one embodiment, a pattern in the roadway that is comprised of sections of one or more materials that produce a response within electromagnetic radiation that encounters the provided materials. Accordingly, a reflected signal from the roadway signature embodies aspects of the roadway signature in electromagnetic characteristics of the reflected radiation. In one embodiment, the material that forms the roadway signature is a material that has particular reflective properties, phase shift properties, and/or other properties that induce a response in electromagnetic radiation as discussed in relation to the markers in FIGS. 2-7. In one embodiment, the material is applied to the roadway in a pattern that is unstructured or randomized to form the roadway signature. That is, the roadway signature is, for example, applied in a splatter painting manner, a drip painting manner (also referred to as Jackson Pollock-style), or another randomized form of application. Accordingly, in one embodiment, the pattern that comprises the roadway signature includes sections of contrasting reflectivity that are randomly dispersed on a surface of the roadway within a driving lane.

Accordingly as illustrated in FIG. 9, the roadway signature includes a combination of curved lines, blobs, and other random forms. It should be appreciated that the roadway signature 915 is illustrated in this manner but may, additionally or alternatively, be comprised of randomized shapes (e.g., rocks coated with the described material) and/or other forms. Moreover, the roadway signature is illustrated as being visible on the roadway 900; however, the illustrated form of the signature 915 is for purposes of illustration, and an actual roadway signature as applied to a roadway may not be responsive in the visible light spectrum. In still a further embodiment, the roadway signature is a geometric pattern characterized by carved ridges or other shapes on a surface of the roadway. Thus, the scanning signal can interact with the geometric pattern to produce the reflected signal according to characteristics that embody the roadway signature.

Accordingly, returning to FIG. 8, the signature module 830 generally includes instructions that function to control the processor 110 to compute an identifier of a roadway signature when detected by the identification module 820. In one embodiment, the signature module 830 computes the identifier from the characteristics of the roadway signature as embodied by the reflected signal and correlated from a mapping of the characteristics over the roadway. As one example, the signature module 830 can analyze the roadway signature to identify minutiae in the roadway signature that can then be correlated to generate the identifier according to, for example, a fingerprinting heuristic. Thus, similar to how a fingerprint can be decomposed into identifying aspects and used to generate a biometric identifier, the roadway signature is processed to produce the noted identifier that uniquely identifies the roadway signature.

Figure 10:
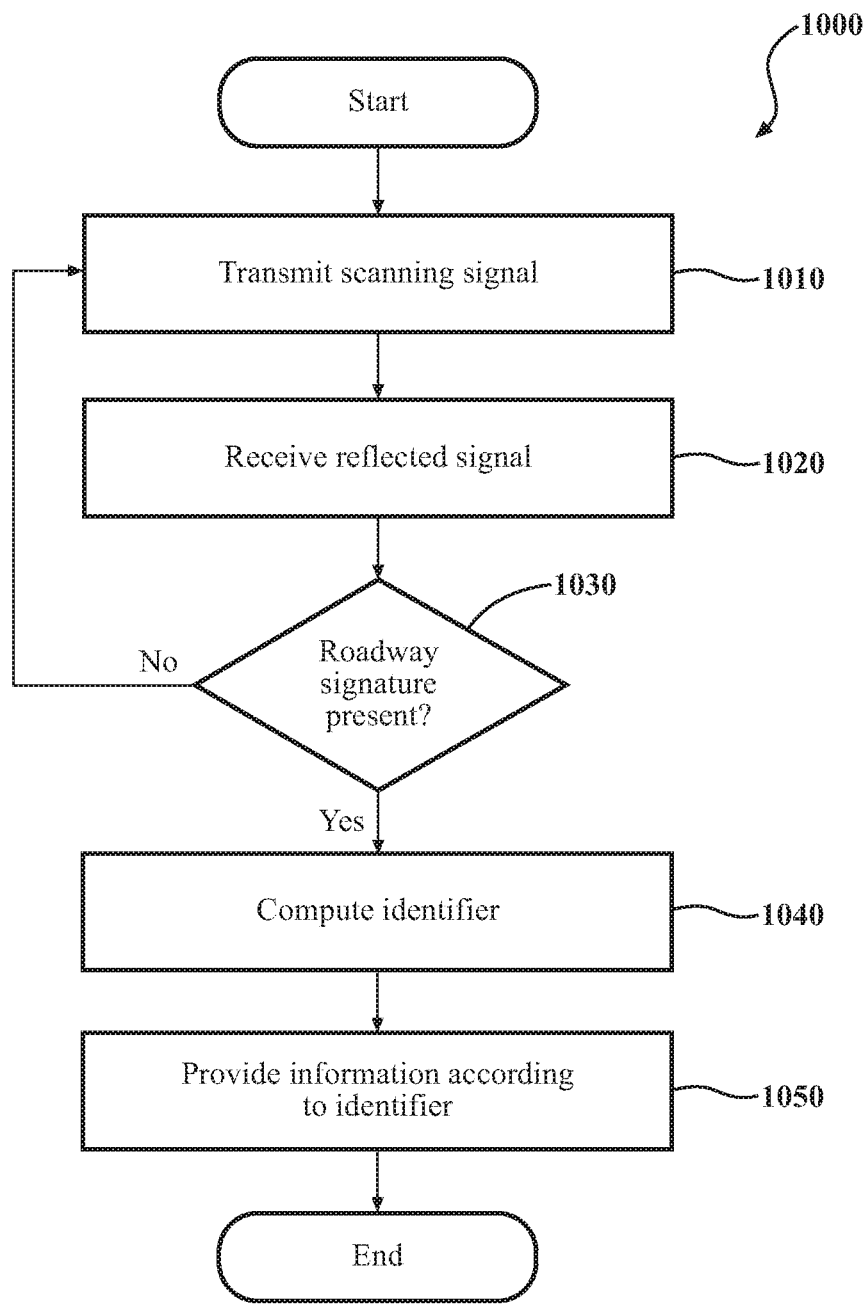
FIG. 10 illustrates one embodiment of a method that is associated with acquiring information from a roadway signature.

Additional details about how the detection system 170 acquires information from roadway signatures will be discussed in relation to FIG. 10. FIG. 10 illustrates a flowchart of a method 1000 that is associated with analyzing reflected signals to identify markers in a roadway. Method 1000 will be discussed from the perspective of the detection system 170 of FIGS. 1 and 8. While method 1000 is discussed in combination with the detection system 170, it should be appreciated that the method 1000 is not limited to being implemented within the detection system 170, but is instead one example of a system that may implement the method 1000.

At 1010, the identification module 820 controls the radar sensor 123 to transmit a scanning signal. As discussed previously, in relation to block 310 of method 300, the scanning signal is a radar signal that is generated to have defined characteristics. For example, the scanning signal has a defined wavelength, intensity, and frequency. Moreover, while a single scanning signal is discussed, it should be appreciated that the scanning signal can be comprised of multiple separate scanning signals from separate sensors within a radar array and/or separate signals over time with the respective signals having the same defined characteristics or, for example, different characteristics for respective ones of the separate signals.

At 1020, the identification module 820 receives a reflected signal resulting from the scanning signal interacting with the roadway. In one embodiment, the identification module 820 continuously or at least semi-continuously receives reflected signals from the roadway at as a result of transmitting the scanning signal. The reflected signals are indicative of properties of the surface of the roadway. For example, depending on properties of materials that comprise the roadway, the defined characteristics are altered in different ways to produce the reflected signals. Thus, the reflected signals embody aspects of the surface of the roadway. Consequently, when the roadway signature is applied to the roadway using a material that attenuates the scanning signal, the reflected signal will have a characteristic lower intensity or not be reflected at all. Similarly, if the applied materials has properties that induce a phase shift, then the reflected signal will have a phase, in comparison with the scanning signal, that is shifted by the defined amount.

At 1030, the identification module 820 analyzes the reflected signal to determine whether a roadway signature is present. In one embodiment, the identification module 820 monitors reflected signals received at 1020 for indicators of the roadway signature. For example, the indicators can include responses induced within the reflected signals. The response is represented by the modified characteristics of the reflected signal such as the change in intensity, shift in phase, and so on. Thus, upon detecting the particular indicia of the roadway signature over a discrete portion of the roadway, the identification module 820 can, for example, provide a notification to the signature module 830 to compute the identifier at 1040. Otherwise, the identification module 820 continues to monitor for a roadway signature. Before proceeding it should be noted, that the roadway signature, in one embodiment, is a discrete pattern that is embedded within the roadway. Accordingly, the identification module 820, may continuously buffer the reflected signal and, upon identifying indicators of the roadway signature in the reflected signal, the identification module 820, transforms the reflected signal into a mapping or otherwise saves the reflected signal to memory so that the signature module 830 can further analyze the reflected signal.

Figure 11:
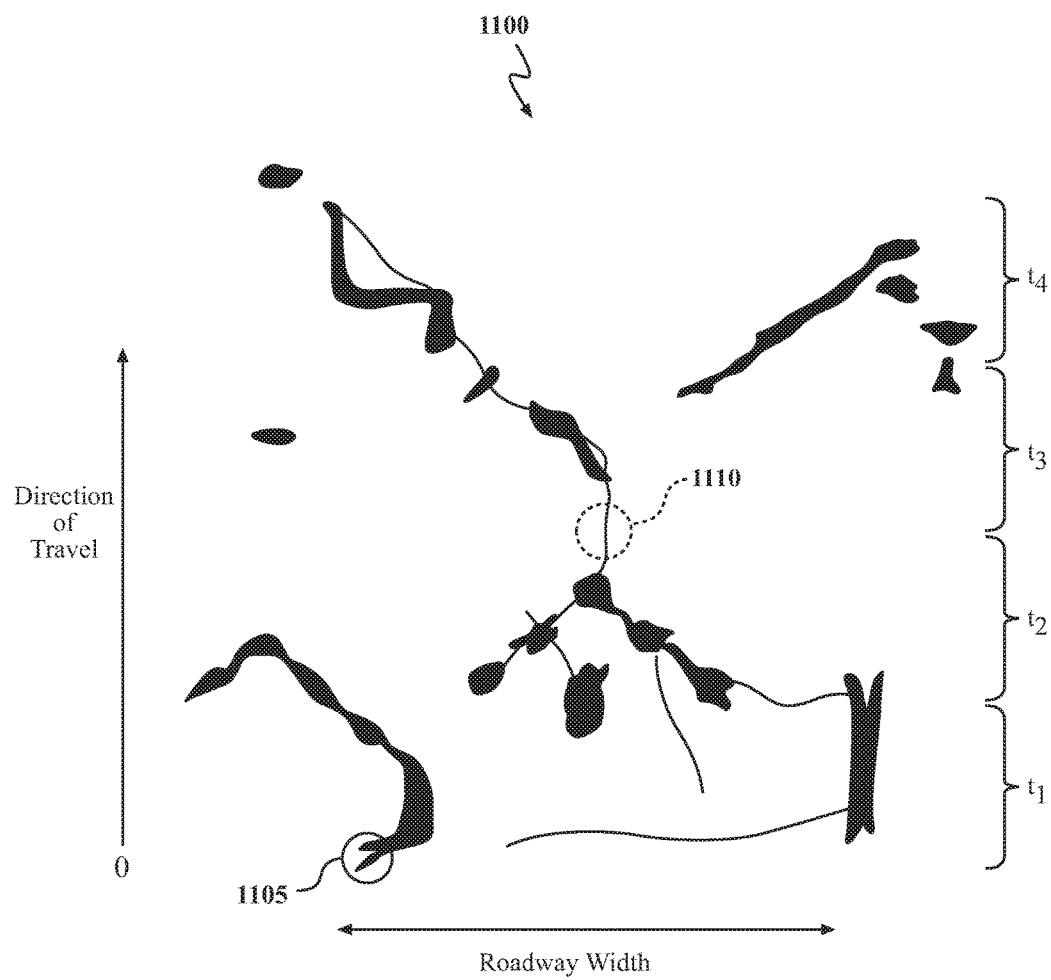
FIG. 11 illustrates a diagram of an embedded roadway signature.

As one example, consider FIG. 11, which illustrates an overhead view of a roadway segment with a roadway signature 1100. The roadway signature 1100 is illustrated as a false color image since the roadway signature is generally not responsive to visible light. In either case, the roadway signature 1100 is a discrete randomized pattern in the roadway that, for example, spans a width (i.e., horizontal x-dimension) or part of the width of the roadway. Additionally, the roadway signature has a discrete length (longitudinal y-dimension) along the roadway. Thus, as the vehicle 100 progresses over the roadway and the detection system 170 is scanning, reflected signals from t1 are initially acquired with t2, t3 and t4 following subsequently. Thus, the identification module 820 identifies the reflected signals from aspects obtained over the portion corresponding with t1 that indicate the presence of the roadway signature 1100. Accordingly, the identification module 820, in one embodiment, saves the reflected signals from t1, t2, t3, and t4 to the memory 210 or another memory/buffer. While the identification module 820 is mentioned as storing the reflected signals, in one embodiment, the identification module 820 stores detected characteristics of the reflected signals such as intensity/amplitude, wavelength, polarity, phase, etc.

Moreover, in one embodiment, the identification module 820 maps characteristics from the acquired reflected signals into a mapping that correlates with coordinates of a surface of the roadway. For example, with reference to FIG. 12, one example of a mapping 1200 as may be produced by the identification module 820 is illustrated. The mapping 1200 is a grid including columns and rows with individual cells corresponding to different sections of the roadway. Each of the rows corresponds with an additional area along the roadway in, for example, a longitudinal y-dimension whereas each column corresponds to a different horizontal component in the x-dimension. Thus, in one embodiment, as the vehicle 100 progresses along the roadway, the identification module 820 populates cells of the mapping 1200 according to characteristics of the reflected signals that correlate with each cell.

Figure 12:
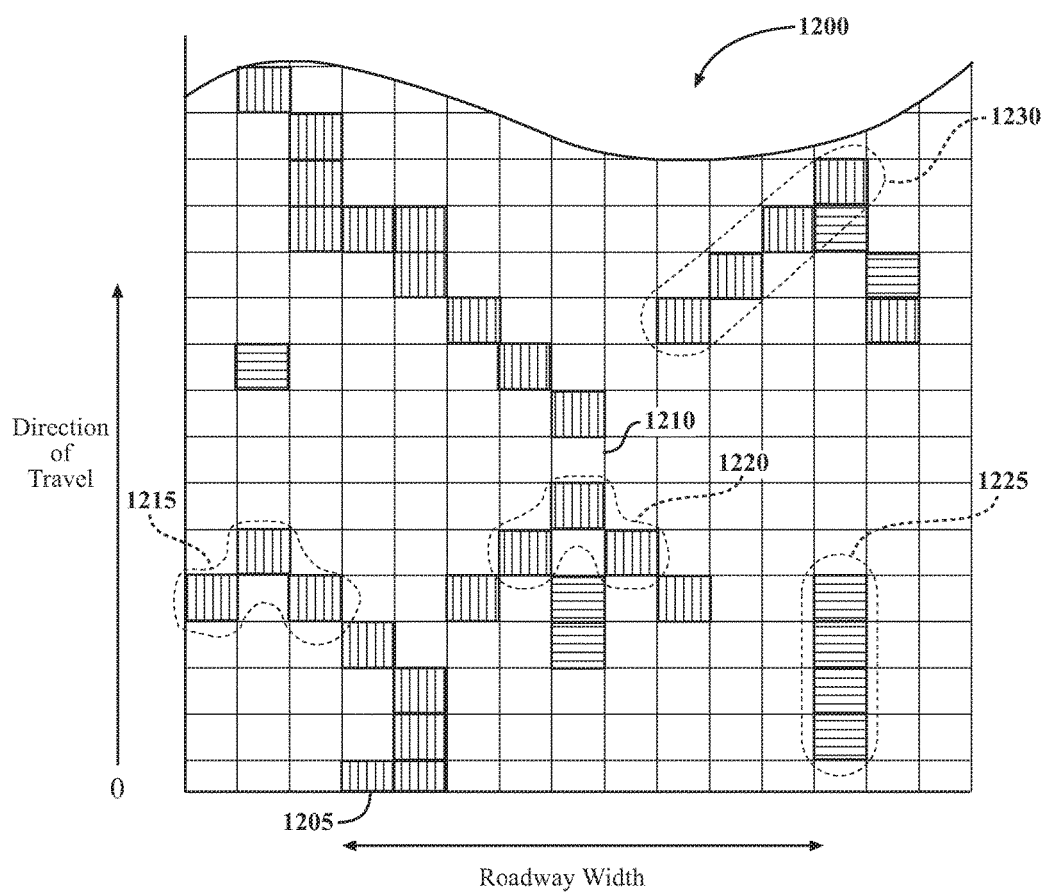
FIG. 12 illustrates a graph representation of relative reflectivities of the embedded roadway signature of FIG. 12.
Figure 13:
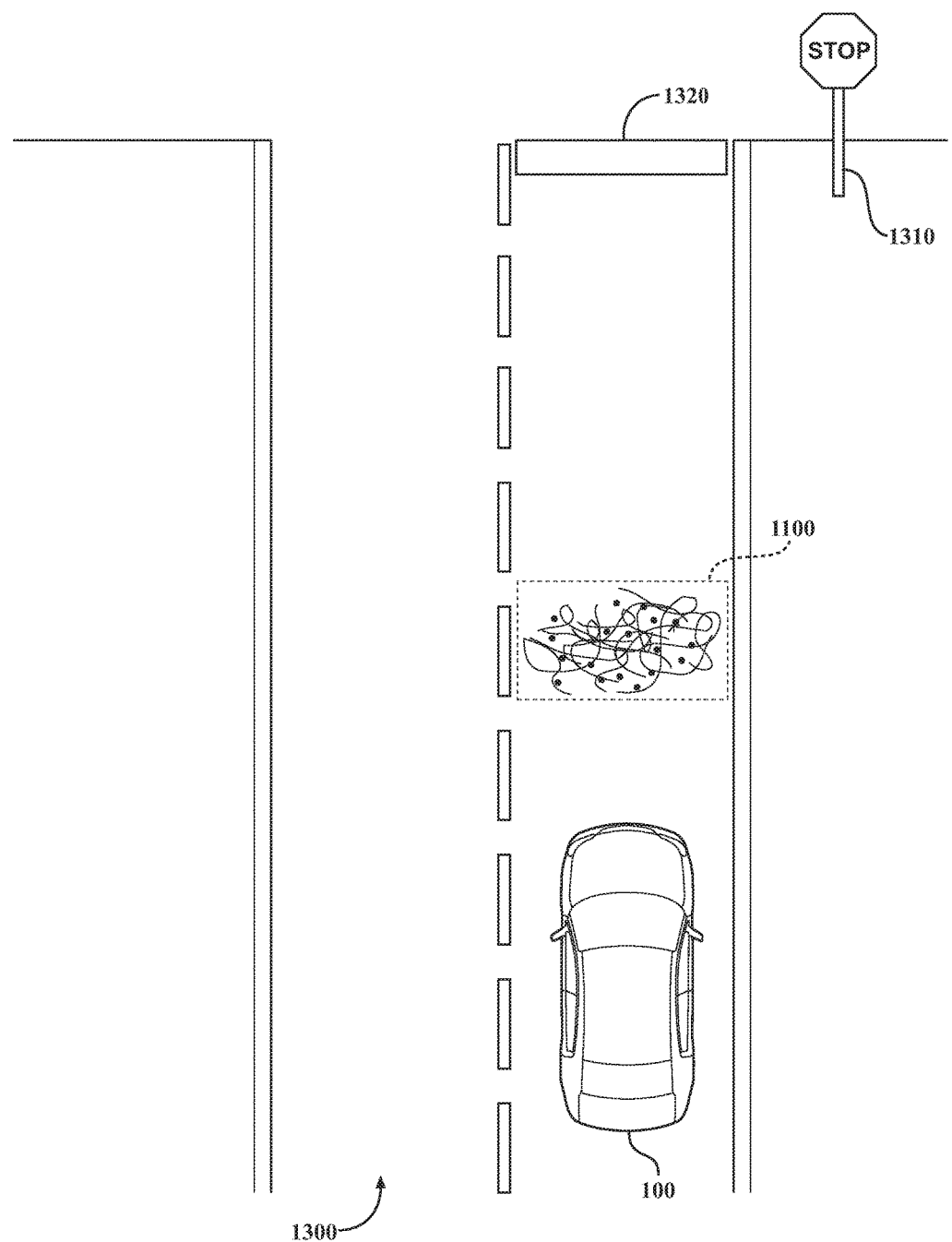
FIG. 13 illustrates an overhead view of a roadway with a roadway signature.

For example, as illustrated in FIG. 12, the identification module 820 progressively populates each row of the mapping 1200 that corresponds with sections along the roadway as the vehicle 100 travels. Additionally, as illustrated, the mapping 1200 is generally directed to a binary detection of whether the roadway signature is detected for a cell or not. However, it should be appreciated that, in various embodiments, the identification module 820 can represent aspects of the roadway signature with additional resolution by indicating a specific value for a characteristic and/or indicating multiple characteristics for each of the cells. However, for purposes of simplicity of illustration, a single characteristic indicating signal intensity has been illustrated. More specifically, the mapping 1200 indicates whether a particular area of the roadway is minimally reflective and includes, for example, radar absorbing material that correlates with the presence of the roadway signature 1100 of FIG. 11.

The identification module 820 indicates whether an intensity of the reflected signal or an overall lack of a reflected signal is indicative of the roadway signature and indicates an affirmative identification by marking a corresponding cell. Thus, as illustrated, the mapping 1200 corresponds to the minimally reflective areas of the roadway signature 1100. Because various anomalies may exist within or on the roadway at various times, the identification module 820, in one embodiment, marks cells according to when characteristics of the reflected signal satisfy a threshold value. Thus, as one example, when the identification module 820 receives a reflected signal from portion 1105 of the roadway signature, the identification module 820 compares an intensity value against the threshold value and marks the cell 1205 upon confirming the low intensity.

By contrast, when the identification module 820 receives a reflected signal from portion 1110 of the signature 1100, the mapping at cell 1210 is not marked because the intensity value associated with the trace portion 1110 is not sufficient. Consequently, anomalies, random noise, and other errors can be filtered from the mapping 1200. Accordingly, the identification module 820, in one embodiment, provides the mapping 1200 as an output to the signature module 830 for further processing.

At 1040, the signature module 830 computes an identifier from the reflected signal as a function of features uniquely associated with the roadway signature that are embodied within the reflected signal. In one embodiment, the signature module 830 processes the reflected signal(s) according to a fingerprinting heuristic to generate the identifier as a unique characterization of the roadway signature. It should be noted, that in various embodiments, an image or mapping of the roadway signature can be generated from the reflected signals and then compared by the signature module 830 against other known roadway signatures stored in, for example, the database 240 to identify the particular signature. However, storing a library of signatures may be a computationally intensive effort. Thus, in one embodiment, the detection system 170 computes the identifier as a placeholder or unique characterization of the roadway signature in order to, for example, avoid storing a whole form of the roadway signature.

Thus, in one embodiment, the signature module 830 computes the identifier over a multi-step process that begins by marking or otherwise identifying features in the roadway signature. By way of example, the signature module 830 parses the mapping of the roadway signature to identify features within the roadway signature that can be used to identify the signature. For example, the signature module 830 can search the mapping for shapes or other registering minutiae that can be used to characterize the roadway signature. In one embodiment, the signature schema 810 defines the features, which are then used for comparison by the signature module 830.

With reference to the mapping 1200 of FIG. 12, the signature schema 810 can define shapes according to grids that correlate with the roadway signature. For example, the signature schema 810 can define a configuration of cells such as cells 1215 and 1220 which generally resemble an upside down "v" as being a feature. As another example, the signature schema 810 can define a column of cells such as cells 1225 and/or diagonal cells 1230 as being features. Consequently, as the signature module 830 parses the mapping 1200, the features 1215, 1220, 1225, and 1230 can be marked. In general, as part of marking the features, the signature module 830 can list the features according to metadata (e.g., feature ID and coordinates) or otherwise modify the mapping 1200 to indicate the presence of the noted features.

Thereafter, the signature module 830 determines relationships between the features by, for example, calculating relative positions between the features (e.g., direction and distance) and/or determining other correlating aspects. In either case, the signature module 830 quantizes these identifying minutiae and the relationships between the identifying minutiae. In one embodiment, the features and the relationships are used by the signature module 830 to produce a graph or other data structure that embodies the elements.

In either case, the signature module 830 computes the identifier by applying a heuristic to the quantized features. In one embodiment, the heuristic is a fingerprinting heuristic or other algorithm as may be used to generate biometric identifiers. Moreover, the algorithm can be a cryptographic algorithm that outputs an authentication code, key, or other numeric value as the identifier upon accepting the quantized features. In either case, the resulting identifier uniquely characterizes the roadway signature so that the roadway signature can be identified when encountered by the vehicle 100. Additionally, as a further matter, producing the identifier according to a cryptographic algorithm and the signature schema 810 can facilitate avoiding spoofing of the roadway signature by malicious interests since the identifier is not easily reproduced without the exact roadway signature, knowledge of the signature schema 810 and the employed algorithm.

As an alternative and/or additional embodiment, the signature module 830 can produce the identifier by translating the mapping into a binary sequence or other quantized format and computing a checksum over the sequence. With either approach, the identifier that is provided as an output by the signature module 830 can be used for different purposes relative to the location of the roadway signature as discussed at 1050.

At 1050, the signature module 830 provides information according to the identifier. In one embodiment, the signature module 830 retrieves information about the roadway or features of the roadway that are proximate to the roadway signature associated with the identifier. For example, consider FIG. 13, which illustrates an overhead view of a roadway 1300. The roadway 1300 is illustrated as including the vehicle 100, the roadway signature 1100 of FIG. 11, a stop sign 1310, and an associated stop marker 1320. Accordingly, as the vehicle 100 travels over the roadway signature 1100 toward the stop sign 1310, the detection system 170 identifies the roadway signature and computes the associated identifier. Subsequently, the signature module 830 uses the identifier to, for example, execute a lookup against the signature lookup 800. Consequently, the signature module 830 acquires information about the roadway 1300 from the signature lookup 800. In the present example, the information identifies the stop sign 1310 and the distance to the marker 1320. In other embodiments, the information may include GPS coordinates of the navigation information, roadway information (e.g., load weight limits, grade percentages, traffic patterns, etc.), and so on.

Moreover, while the lookup operation is generally discussed as being a local operation, in one embodiment, the database 240 and the signature lookup 800 are located remotely from the detection system 170 and the signature module 830 provides the identifier in a communication over a cellular or other communication network to query a service for information relating to the roadway 1300. Thus, information that is provided in response from the service can be dynamically updated according to weather conditions, traffic, constructions, and so on in addition to other information about the roadway 1300 itself.

As an additional note, the roadway signatures as discussed in relation to FIGS. 8 and 10 are generally understood to be discrete. That is, the roadway signatures in relation to the embodiment of method 1000 are not pervasive throughout the roadway, but are instead of a defined length along the roadway and breadth across the roadway. Thus, as the detection and acquisition of information relates to the embodiments disclosed in relation to the method 1000, the roadway signatures can be strategically placed to facilitate controlling an autonomous vehicle by embedding identifiers associated with information relevant to navigating the particular section of roadway.

Roadway Signature with Localization

Figure 14:
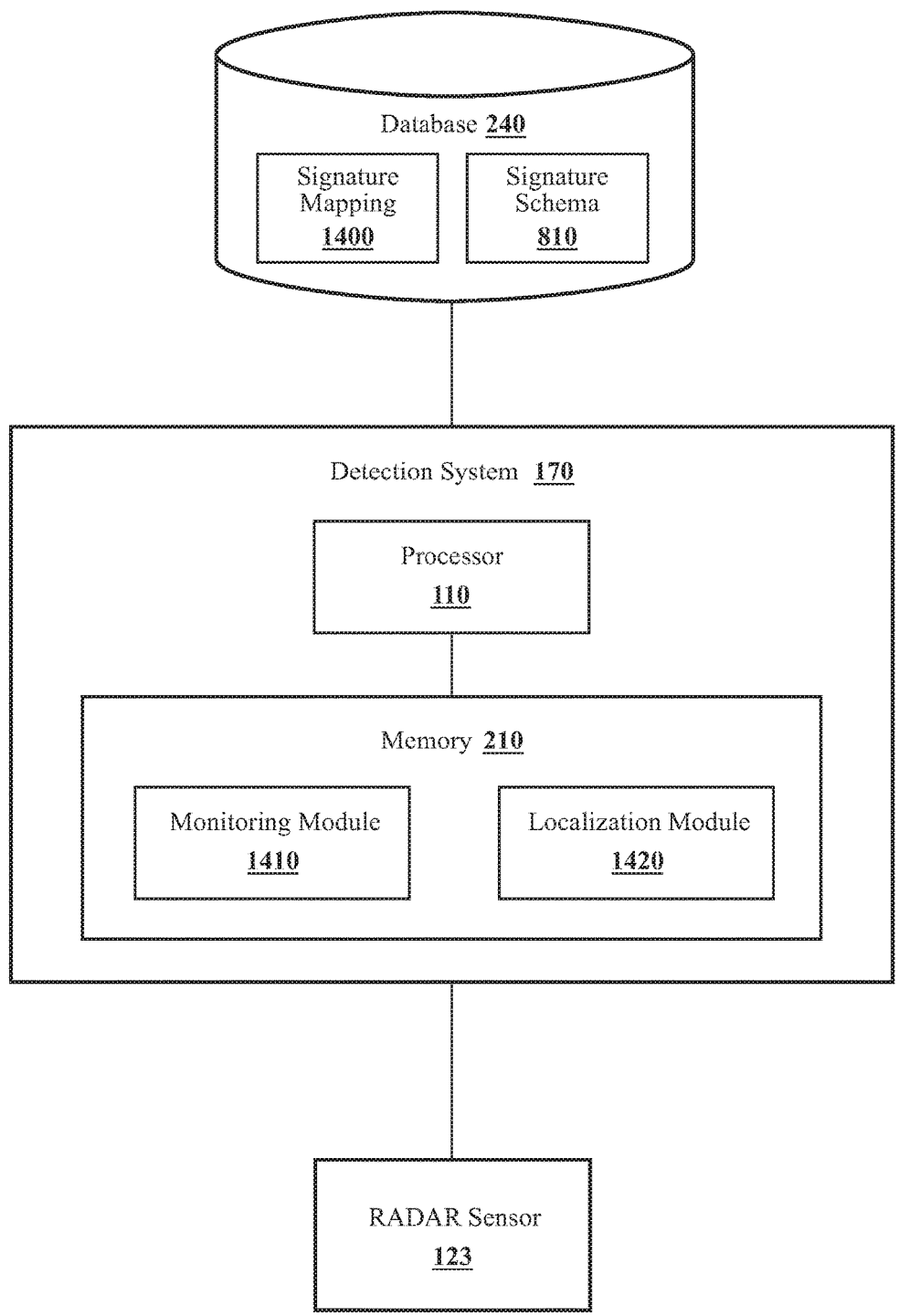
FIG. 14 illustrates one embodiment of a detection system that is associated with localizing a vehicle according to a signature mapping.

With reference to FIG. 14, an alternative embodiment of the detection system 170 of FIGS. 2 and 8 is illustrated. As illustrated in FIG. 14, the detection system 170 includes elements similar to those discussed in relation to FIGS. 2 and 8, however, a general configuration of the elements may differ. For example, the database 240, in FIG. 14, is illustrated as storing the signature schema 810 from FIG. 8 in addition to a signature mapping 1400. It should be noted that while the database 240 is not illustrated as including the marker schema 250 or the signature lookup 800, in various embodiments, the database 240 may still include the noted elements in addition to the signature mapping 1400. Additionally, the database 240, as previously noted, may be a cloud-based or distributed memory that is accessed over a communications link. Moreover, in FIG. 14, the detection system 170 is illustrated as including a monitoring module 1410 and a localization module 1420. In various embodiments, the modules 1410 and 1420 can include elements similar to the modules 220, 230, 820 and 830 in addition to further aspects as discussed in relation to FIG. 14.

Furthermore, in FIG. 14, the detection system 170 is shown as including the processor 110 from the vehicle 100 of FIG. 1. Accordingly, as previously noted, the processor 110 may be a part of the detection system 170, the detection system 170 may include a separate processor from the processor 110 of the vehicle 100, or the detection system 170 may access the processor 110 through a data bus or another communication path. In one embodiment, the detection system 170 includes the memory 210 that stores the monitoring module 1410 and the localization module 1420. The modules 1410 and 1420 are, for example, computer-readable instructions that when executed by the processor 110 cause the processor 110 to perform the various functions disclosed herein. Accordingly, the monitoring module 1410 generally includes instructions that function to control the processor 110 to retrieve data from sensors of the sensor system 120 in a similar manner as discussed in relation to the scanning module 220 of FIG. 2 and the identification module 820 of FIG. 8. That is, the monitoring module 1410, in one embodiment, controls the radar sensor 123 to transmit a scanning signal and to receive a reflected signal resulting from the scanning signal reflecting from surfaces in a surrounding environment. In particular, the monitoring module 1410, in one embodiment, controls a radar array as illustrated in FIG. 9 to scan a surface of a roadway on which the vehicle 100 is traveling.

Moreover, the monitoring module 1410 is, in one embodiment, configured in a similar manner as the identification module 820 of FIG. 8. Thus, the monitoring module 1410 controls the radar sensor 123 to transmit a scanning signal and to receive a resulting reflected signal from the roadway. Furthermore, the monitoring module 1410, in one embodiment, is also configured to detect the roadway signature and compute an identifier in a similar manner as discussed in relation to the signature module 830 of FIG. 8.

However, because the roadway signature is, in one embodiment, continuous or at least semi-continuous along the roadway, the monitoring module 1410 also includes instructions to acquire a fix on the roadway signature, as will be discussed in further detail subsequently. As further explanation of the general format of the continuous roadway signature, FIGS. 15-17 will be discussed prior to further discussion of the detection system 170. Accordingly, with reference to FIG. 15, one example of a roadway 1500 is illustrated that includes two lanes 1505 and 1510. Each of the lanes 1505 and 1510 include a separate continuous roadway signature 1515 and 1520. The continuous roadway signatures 1515 and 1520 are similar to the roadway signature 1100 of FIG. 11 with the exception of being substantially continuous along the roadway instead of discrete. Thus, the roadway signatures 1515 and 1520 are comprised of the same or similar configurations of materials (e.g., radar absorbing material) and generally blend in with the roadway surface 1500 as viewed in the visible light spectrum.

Figure 15:
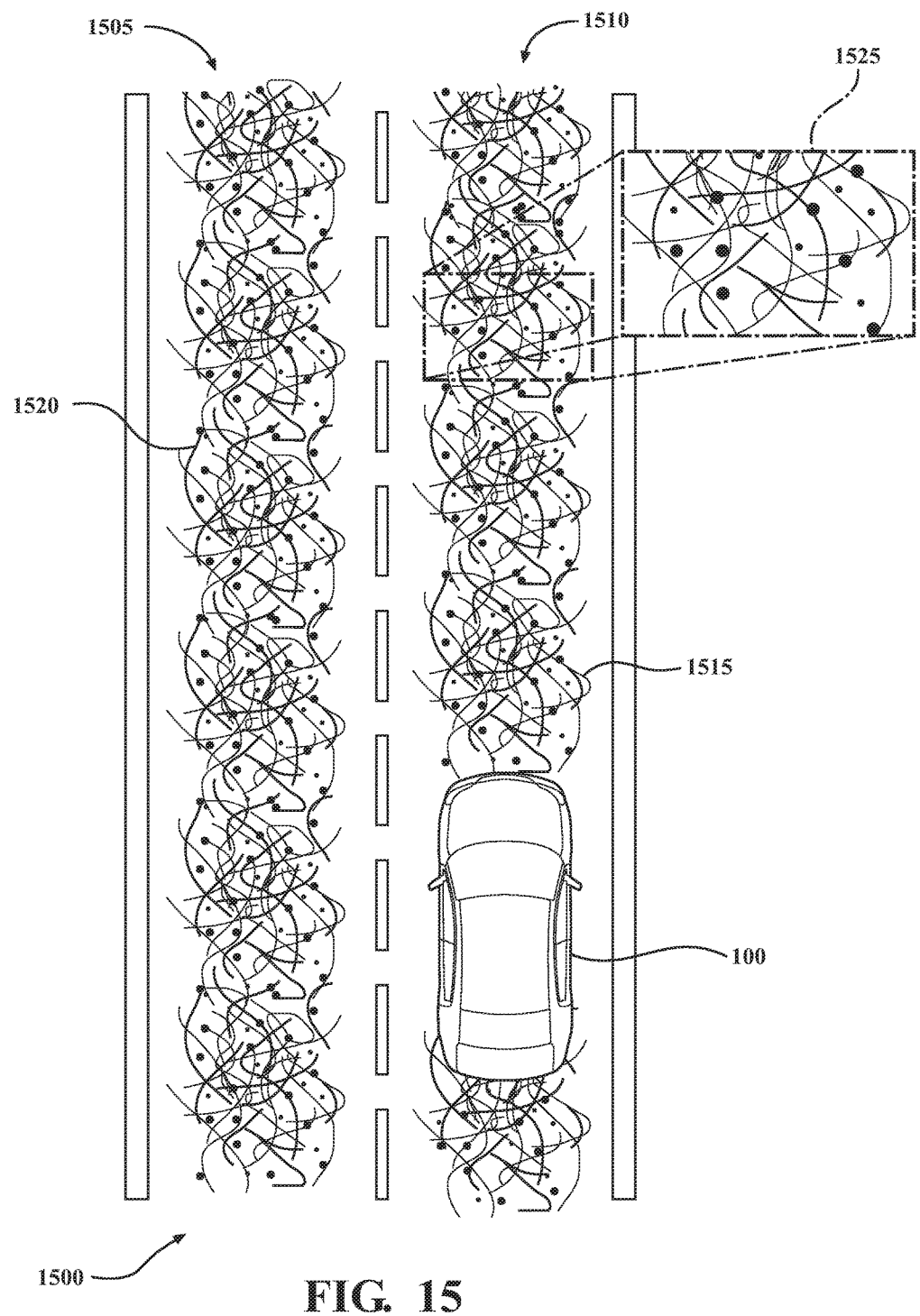
FIG. 15 illustrates an overhead view of a roadway that includes a continuous roadway signature randomly formed on a surface of the roadway.

The magnified view 1525 of a segment of the roadway signature 1515 illustrates a general form of the roadway signature 1515, which is similar to the roadway signature 1520. That is, the roadway signature 1515 is comprised of a material applied to the roadway within the lane 1510. The material is applied in a randomized manner that can be characterized as a drip or splash painting method. Accordingly, as pictured in the view 1525 the segment of the roadway signature 1515 includes lines and curves of varying thickness, various spots and shapes of differing sizes and orientations, overlapping/intersecting lines, and other features that may be expected when using the described application method. Furthermore, as illustrated in FIG. 15, the roadway signatures 1520 and 1515 are applied to be substantially centered within the respective lanes 1505 and 1510. Thus, as will be discussed in greater detail subsequently, the detection system 170 can use a placement of the roadway signature 1515 to guide the vehicle 100 along the roadway 1500 when, for example, operating in an autonomous mode.

Figure 16:
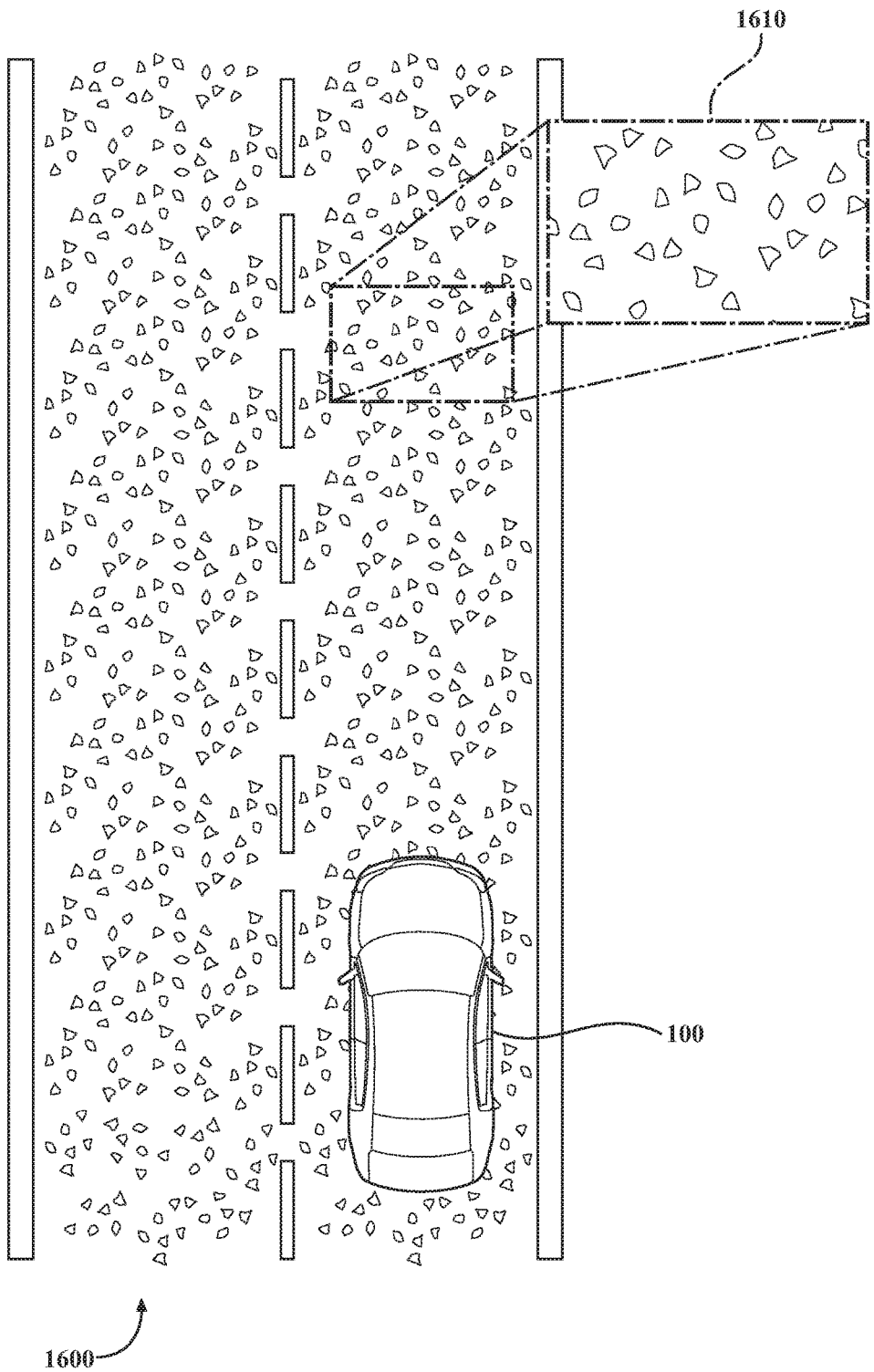
FIG. 16 illustrates an overhead view of a roadway that includes a continuous roadway signature formed from an aggregate embedded within the roadway.

As a further example of how the continuous roadway signature may be implemented, consider FIG. 16, which illustrates a roadway 1600. The roadway is illustrated in a similar configuration as the roadway 1500, however, instead of the roadway signature being constrained to a center area of each lane, the roadway signature of FIG. 16 is pervasive throughout the roadway 1600. That is, the roadway signature illustrated in FIG. 16 is distributed across the whole roadway 1600 without being applied to just a center region of each lane as with the roadway signatures 1515 and 1520 of FIG. 15. A manner of embedding the roadway signature as shown in FIG. 16 can include mixing stone or other aggregate with particular electromagnetic properties into asphalt, concrete or whichever material is used to construct the roadway 1600. Moreover, the stone or other aggregate may be coated with a paint, epoxy or other coating that imparts the aggregate with the particular electromagnetic properties. As one example, stone may be coated with a radar absorbing material (RAM) and mixed with other materials that are used to construct the roadway 1600 at a prescribed ratio. In further embodiments, different aggregate that has been modified to have separate electromagnetic properties may be mixed together to form the roadway signature as shown in FIG. 16. Thus, stones with a relatively high reflectivity, a relatively low reflectivity, with phase shifting properties, and so on can be mixed together and embedded within the roadway 1600 to form the roadway signature.

A magnified view 1610 of the roadway, illustrates a response to a scanning radar signal of the aggregate that forms the roadway signature. As shown in the view 1610, the aggregate is mixed into the roadway 1600 at a, for example, 10% rate by way of area in comparison to the asphalt. However, in other embodiments, the mixing rate can be higher, lower, or varied along a length of the roadway 1600 to provide greater variability to the roadway signature.

Figure 17:
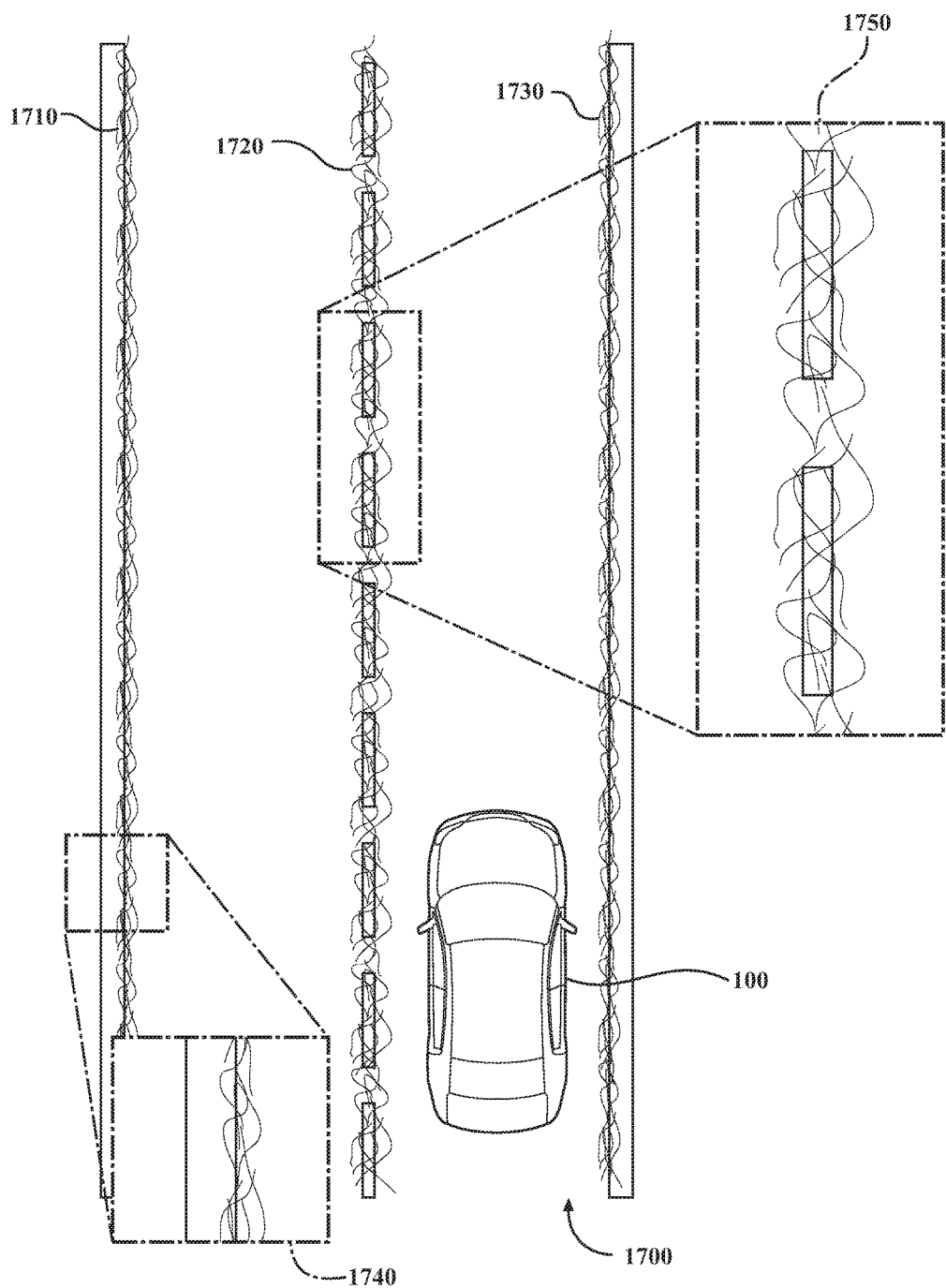
FIG. 17 illustrates an overhead view of a roadway that includes a roadway signature marking boundaries of lanes.

A further example of the continuous roadway signature is illustrated in relation to FIG. 17. FIG. 17 includes continuous roadway signatures 1710, 1720, and 1730. As with the previous illustrations of the roadway signatures, the signatures 1710, 1720, and 1730 are shown in a false-color format since the signatures otherwise blend in with the roadway under visible light. In either case, the signatures 1710 and 1730 are edge marker roadway signatures that are continuous along respective edges of the roadway 1700. The roadway signature 1720 is an example of a centerline roadway signature that is continuous along a centerline of the roadway 1700. Accordingly, the roadway signatures 1710, 1720, and 1730 generally correspond to lane markers of the roadway 1700 instead of being located within a center region of each lane as with the roadway signatures 1515 and 1520. Thus, the roadway signatures 1710, 1720, and 1730 supplement the visible markers as a form of marking lanes of the roadway 1700 for detection using radar signals. Moreover, as with the roadway signatures discussed along with FIG. 10, the roadway signatures 1710, 1720, and 1730 can be processed to produce an identifier or series of identifiers that correlate various information associated with the particular segments of the roadway.

Furthermore, because the signatures 1710, 1720, and 1730 are located along portions of the roadway that experience less wear, the signatures 1710, 1720, and 1730 may also avoid degradation from being located as shown. As a further aspect of the continuous roadway signatures, detection of the signatures using radar signals avoids difficulties with visually perceiving the signatures since the electromagnetic radiation can penetrate snow, ice and other precipitation along with certain debris that may otherwise occlude a visible light camera from imaging lane markers.

While the various roadway signatures of FIGS. 15, 16, 17, and 11 are illustrated and discussed separately, in various embodiments, the signatures can be combined into a single roadway together and/or at various different locations to separately provide information. Similarly, in one embodiment, the lane markers can be modified to include the electromagnetic signature as discussed in relation to FIGS. 3 and 4 along with providing the discrete and/or continuous roadway signatures of FIGS. 11, 15, 16, and 17. In either case, further details about the continuous roadway signatures will be discussed in relation to FIG. 18.

Figure 18:
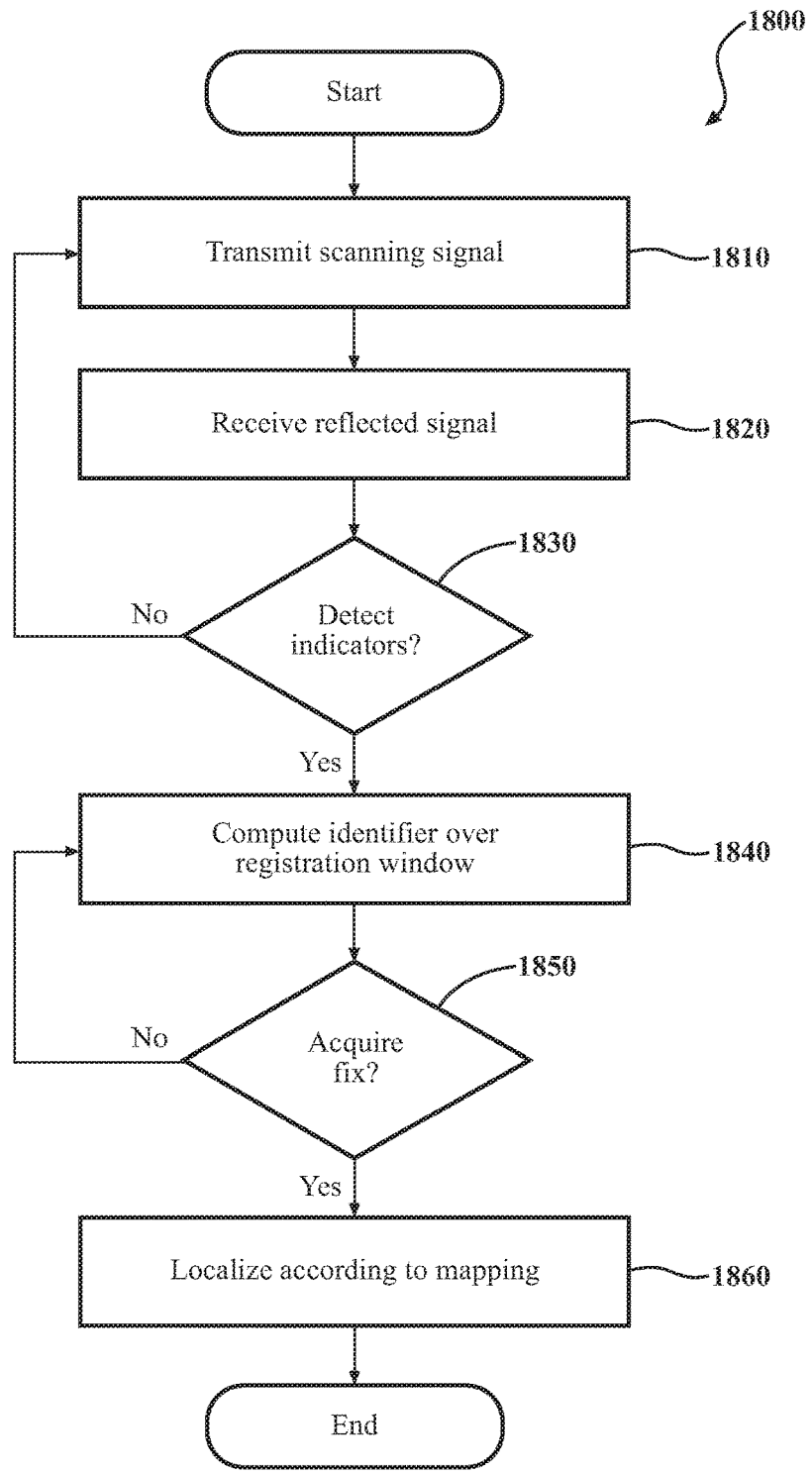
FIG. 18 illustrates one embodiment of a method that is associated with localizing a vehicle on a roadway using a roadway signature.

Additional details about how the detection system 170 acquires a fix on the continuous roadway signatures and localizes the vehicle will be discussed in relation to FIG. 18. FIG. 18 illustrates a flowchart of a method 1800 that is associated with using a roadway signature and associated signature mapping to localize a vehicle. Method 1800 will be discussed from the perspective of the detection system 170 of FIGS. 1 and 14. While method 1800 is discussed in combination with the detection system 170, it should be appreciated that the method 1800 is not limited to being implemented within the detection system 170, but is instead one example of a system that may implement the method 1800.

At 1810, the monitoring module 1410 scans the roadway by transmitting a scanning signal at a surface of the roadway. In one embodiment, the monitoring module 1410 scans the roadway by causing the radar 123 to generate at least one scanning signal in a similar fashion as discussed in relation to 1010 of FIG. 10. Thus, as discussed previously, in relation to block 310 of method 300 and block 1010 of FIG. 10, the scanning signal is a radar signal that is generated to have defined characteristics. For example, the scanning signal has a defined wavelength, intensity, and frequency. Moreover, while a single scanning signal is discussed, it should be appreciated that the scanning signal can be comprised of multiple separate scanning signals from separate sensors within a radar array and/or separate signals over time.

Additionally, while block 1810 is illustrated as a single discrete element, in one embodiment, the monitoring module 1410 controls the radar sensor 123 to continuously or at least semi-continuously transmit the scanning signal so that the roadway signature is continually scanned as the vehicle 100 progresses along the roadway. In this way, the detection system 170 can acquire information from the continuous roadway signatures while traveling.

At 1820, the monitoring module 1410 receives a reflected signal resulting from the scanning signal interacting with the roadway. As noted previously, while a single discrete signal is discussed, in various implementations the monitoring module 1410 continuously or at least semi-continuously receives reflected signals from the radar sensor 123 continually scanning the roadway. Furthermore, in one embodiment, the monitoring module 1410 receives the reflected signals in a similar as discussed in relation to the identification module 820 at block 1020 of method 1000. Accordingly, the reflected signals are indicative of properties of the surface of the roadway. For example, depending on properties of materials that comprise the roadway, the defined characteristics are altered in different ways to produce the reflected signals. Thus, the reflected signals embody aspects of the surface of the roadway. Consequently, when the roadway signature is applied to the roadway using a material that attenuates the scanning signal, the reflected signal will have a characteristic lower intensity or not be reflected at all. Similarly, materials with a relatively higher reflectivity, or with phase shifting characteristics will induce corresponding changes in the scanning signal to produce the reflected signal.

At 1830, the monitoring module 1410 determines whether one or more indicators of a roadway signature are present within a reflected signal from the roadway. As discussed in relation to the identification module 820 and block 1030 previously, the monitoring module 1410 executes in a similar fashion to detect the continuous roadway signature. That is, the monitoring module 1410 monitors characteristics of the reflected signals for indicators that correspond to the roadway signature. As previously mentioned, the indicators can be defined in, for example, the signature schema 810 and generally include threshold values relating to signal intensity, phase, and other characteristics of the reflected signal relative to the scanning signal.

As an additional matter, because the continuous roadway signature is, for example, generally continuous and thus present wherever the vehicle 100 is located throughout the roadway, the process of detecting the roadway signature at 1830 is generally focused on determining a segment of the roadway signature along with detecting a general presence of the roadway signature. Thus, in one embodiment, the monitoring module 1410 detects a segment of the roadway signature over a registration window prior to proceeding to computing an identifier at 1840. The registration window is, in one embodiment, an area within which the detection system 170 focuses analysis and that generally aligns with a location on which the radar sensor 123 is focused.

Thus, the registration window is generally focused on a segment of the roadway signature with a defined width across the roadway and defined length along the roadway. As one example, the registration window may be a standardized width that correlates to an average width between front wheels of a vehicle while having a length along the roadway that is, for example, several feet. Of course, these dimensions are intended only as an example and particular dimensions of the registration window may be selected according to a particular implementation.

Additionally, in one embodiment, the registration window is dynamic with respect to a segment of the roadway which is bounded by the registration window as the vehicle 100 travels along. Thus, the registration window is, for example, continuously moved in either a step-wise manner or a sliding manner to correspond with movement of the vehicle 100. For example, in the instance of being moved in a step-wise manner, portions of the roadway signature from a previous window would not occur in a subsequent window. Thus, the step-wise registration windows would be, for example, consecutive segments along the roadway that do not overlap. By contrast, the sliding registration window is continuously progressed along with movement of the vehicle 100 to include new portions of the roadway signature while sliding past older segments. In one embodiment, the sliding registration window can be modeled in a similar manner as a first-in first-out (FIFO) buffer.

In either case, at 1830, the monitoring module 1410 monitors for the indicators and, in one embodiment, monitors for the indicators to substantially fill a registration window so that the monitoring module 1410 can confirm the roadway signature is present prior to proceeding with computing the identifier at 1840.

At 1840, the monitoring module 1410 computes an identifier for the segment of the roadway signature within the registration window. In one embodiment, the monitoring module 1410 computes the identifier at 1840 in a similar manner as discussed previously in relation to the signature module 830 and block 1040 of method 1000. Thus, for purposes of brevity, discussion of computing the identifier will not be reiterated. However, it should be appreciated that the monitoring module 1410 computes the identifier for the segment of the roadway signature that is within the registration window. Thus, an initial identifier that is computed at block 1840 is for an initial detection of the roadway signature when, for example, the vehicle 100 is initialized, turns onto a roadway that includes the signature, resets scanning of the signature and so on. In either case, the identifier that is produced by the monitoring module 1410 is a unique characterization of the segment of the roadway signature that is bounded by the registration window.

At 1850, the monitoring module 1410 acquires a fix on the roadway signature. In one embodiment, the monitoring module 1410 acquires the fix as a function of the one or more indicators that uniquely identify the segment of the roadway signature. That is, the monitoring module 1410 uses the identifier computed at block 1840 and which characterizes the indicators of the roadway signature to acquire the fix. In one embodiment, acquiring the fix refers to identifying where within the roadway signature the segment is located and by extension where the vehicle 100 is located so that subsequent segments can be correlated to the signature mapping 1400.

In one embodiment, the monitoring module 1410 references the signature mapping 1400 as a manner of determining the segment of the roadway signature. For example, the signature mapping 1400, in one embodiment, is a mapping between identifiers of the roadway signature and different segments of the roadway. For example, in one embodiment, the monitoring module 1410 acquires the fix by computing a moving average over multiple identifiers (e.g., as checksums) for multiple segments in order to correlate a larger section of the roadway with the signature mapping 1400. In this way, the monitoring module 1410 can refine a segment of the signature mapping 1400 that is being searched and can also adjust the registration window to align with, for example, a preferred orientation for acquiring the roadway signature. In general, the fix refers to the monitoring module 1410 determining a correspondence between the computed identifier(s) and identifiers defined in the signature mapping 1400. Thus, the monitoring module 1410 acquires the fix in a similar fashion as a GPS receiver locks onto satellites. Thus, in order to acquire the fix, the monitoring module 1410 determines where within the roadway signature, in correspondence with the signature mapping 1400, the acquired segment of the roadway signature is located.

However, if, for example, the identifier does not match the signature mapping 1400, then the identifier can be recomputed at 1840 over a subsequent section, by adjusting the registration window over the present segment, or by otherwise re-computing the identifier in order to align the registration window with segments of the roadway signature as correlated in the signature mapping 1400. In this way, subsequent segments of the roadway signature can be anticipated, and the vehicle 100 can be localized as will be discussed further in relation to block 1860.

It should be noted, that while the signature mapping 1400 is discussed as being a mapping of identifiers of the roadway signature and respective locations of the identifiers within the roadway, in various embodiments, the signature mapping 1400 may instead be a reproduction of the roadway signature that is overlaid onto a cartographic mapping of the roadway and/or a satellite image based mapping of the roadway. Moreover, the signature mapping 1400, in one embodiment, includes additional information that corresponds to aspects of the roadway in relation to respective ones of the identifiers. That is, the identifiers in the signature mapping 1400 can include additional metadata that indicates a proximity to traffic signals and other roadway features. Additionally, in one embodiment, the identifiers in the signature mapping 1400 can be linked with alerts and/or other information that is provided to occupants of the vehicle 100 upon passing the particular segment of the roadway signature on the roadway.

At 1860, the localization module 1420 localizes the vehicle 100 on the roadway according to the signature mapping 1400. In one embodiment, the localization module 1420 identifies a location for the segment of the roadway signature on the roadway and uses the indicated location as a location of the vehicle 100. In general, the localization module 1420 locates the vehicle both along the roadway in a longitudinal y-dimension and also in a horizontal x-dimension in relation to where within a lane the vehicle 100 is located. Thus, the localization module 1420 can determine a precise location for facilitating autonomously controlling the vehicle and/or otherwise navigating the vehicle along a route.

Accordingly, the roadway signature can uniquely identify a location along a width of the roadway by varying as the vehicle 100 moves toward lane markers. That is, the roadway signature is configured so that as the vehicle 100 moves toward one side of the roadway within a lane, the registration window moves over a skewed/different segment of the roadway signature. Accordingly, the detection system 170 computes an identifier that is unique to the particular location within the lane in a horizontal component and in a longitudinal component. Thus, while the registration window was discussed in various embodiments as the vehicle 100 moves along the roadway, the registration window similarly can be shifted from side-to-side within a lane. Consequently, the identifier reflects the precise location within the roadway in relation to the roadway signature.

Moreover, in one embodiment, the localization module 1420 continuously or at least semi-continuously tracks the location of the vehicle 100 by computing an identifier for each subsequent segment of the roadway signature. Accordingly, the localization module 1420 can determine a precise location by referencing the identifiers against the signature mapping 1400, but can also determine, for example, a trajectory. Additionally, while localization of the vehicle 100 and the computation of the identifiers are discussed as discrete computations and comparisons, in one embodiment, the localization module 1420 localizes the vehicle 100 by computing a moving average of the identifiers and/or by computing the identifiers at a rate (e.g., every 0.1 seconds) that is sufficient to precisely track the vehicle 100 along the roadway using the signature mapping 1400. In this way, the detection system 170 can determine a location of the vehicle 100 to autonomously control the vehicle 100 without using, for example, additional sensors such as LIDAR sensors to localize the vehicle according to other methods.

As a further matter, information that is used to form the signature mapping 1400 itself is, in one embodiment, sourced from a plurality of vehicles traveling on various roadways. For example, the information of the signature mapping 1400 can be stored in a cloud-based storage or other distributed storage and can be updated from data that is streamed from the plurality of vehicles. Accordingly, modifications to the roadway signature from wear, construction, and/or other circumstances can be tracked and the signature mapping 1400 can be maintained in real-time as an accurate representation of the roadway signature. Therefore, in one embodiment, the detection system 170 provides mechanisms to improve how the vehicle 100 detects markers on a roadway and/or how the vehicle 100 determines a location on the roadway.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information produced from or about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate to the vehicle 100, off-road objects, and so on.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. The input system 130 can encompass any device, or system that enables information/data to be entered into a machine. The input system 130 can receive an input from a vehicle passenger (e.g. a driver or a passenger). The vehicle 100 can include an output system 135. The output system 135 includes any device that enables information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the detection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the detection system 170, and/or the autonomous driving module(s) 160 may control some or all of these vehicle systems 140 and, thus, may be partially or fully autonomous.

The processor(s) 110, the detection system 170, and/or the autonomous driving module(s) 160 can be operatively connected to communicate with the various vehicle systems 140 and/or individual components thereof. For example, returning to FIG. 1, the processor(s) 110, the detection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the detection system 170, and/or the autonomous driving module(s) 160 may control some or all of these vehicle systems 140.

The processor(s) 110, the detection system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the detection system 170, and/or the autonomous driving module(s) 160 can control the direction and/or speed of the vehicle 100. The processor(s) 110, the detection system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the detection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-2, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A detection system for detecting a marker on a roadway, comprising:
    one or more processors;
    a memory communicably coupled to the one or more processors and storing:
    a scanning module including instructions that when executed by the one or more processors cause the one or more processors to control a radar to actively transmit a scanning signal with defined characteristics including a wavelength within a radar-band of the electromagnetic spectrum that is a non-visible portion of the electromagnetic spectrum, wherein the radar is integrated with a vehicle that is traveling on the roadway; and
    a detection module including instructions that when executed by the one or more processors cause the one or more processors to, in response to receiving a reflected signal resulting from the scanning signal interacting with the roadway, identify the marker from the reflected signal according to an electromagnetic signature of the marker embodied in the reflected signal including identifying the electromagnetic signature according to a contrasting region in the roadway having a contrasting reflectivity of the wavelength in comparison to surrounding sections of the roadway,
    wherein the electromagnetic signature is a response induced within the defined characteristics of the scanning signal that is embodied within the reflected signal, and wherein the contrasting region is an area with a relatively lower reflectivity for the wavelength within the electromagnetic spectrum than the surrounding sections and that is induced within the reflected signal when the scanning signal is reflected from the marker comprised of electromagnetic radiation absorbing material.

2. The detection system of claim 1, wherein the marker is one of a lane marker and a surface traffic marker, wherein the scanning signal and the reflected signal are electromagnetic radiation within a radar band of the electromagnetic spectrum, wherein the detection module further includes instructions to identify the marker according to the electromagnetic signature by identifying the electromagnetic signature as one or more of:

(i) a contrasting region in the roadway that is characterized by a substantially contrasting reflectivity in comparison to surrounding sections of the roadway, and (ii) a phase region in the roadway that is characterized by a defined phase shift as a response produced in the reflected signal relative to the defined characteristics of the scanning signal.

3. The detection system of claim 2, wherein the detection module further includes instructions to identify the marker by:

(i) analyzing the reflected signal to locate the contrasting region within the roadway, and (ii) determining whether a shape of the contrasting region correlates with a type of the marker and an expected location within the roadway.

4. The detection system of claim 1, wherein the detection module further includes instructions to identify whether a roadway code is present within the marker according to an outlined shape of the electromagnetic signature within the marker and between successive markers along the roadway.

5. The detection system of claim 4, wherein the detection module further includes instructions to decode the marker according to a marker schema to provide embedded information of the roadway code as output to the vehicle in response to determining that the marker includes the roadway code.

6. The detection system of claim 5, wherein the embedded information is one of: a barcode, a binary code, a ternary code, and a QR code, and wherein the detection module further includes instructions to identify the marker by determining whether the determined shape, area, and electromagnetic signature satisfy a marker threshold that indicates a confidence interval for accepting a determined shape, area, and electromagnetic signature as indicating a presence of the marker.

7. The detection system of claim 4, wherein the scanning module further includes instructions to control the vehicle according to the identified marker and associated embedded information, and wherein the embedded information includes information about the roadway.

8. The detection system of claim 1, wherein the scanning module further includes instructions to receive the reflected signal when a surface of the roadway is covered with precipitation, and wherein the radar is an array of radar sensors located within a forward section of the vehicle and oriented toward the surface of the roadway.

9. A non-transitory computer-readable medium storing instructions that when executed by one or more processors cause the one or more processors to:

control a radar to actively transmit a scanning signal with defined characteristics including a wavelength within a radar-band of the electromagnetic spectrum that is a non-visible portion of the electromagnetic spectrum, wherein the radar is integrated with a vehicle that is traveling on a roadway; and in response to receiving a reflected signal resulting from the scanning signal interacting with the roadway, identify a marker within the roadway from the reflected signal according to an electromagnetic signature of the marker embodied in the reflected signal including identifying the electromagnetic signature according to a contrasting region in the roadway having a contrasting reflectivity of the wavelength in comparison to surrounding sections of the roadway, wherein the electromagnetic signature is a response induced within the defined characteristics of the scanning signal that is embodied within the reflected signal, and wherein the contrasting region is an area with a relatively lower reflectivity for the wavelength within the electromagnetic spectrum than the surrounding sections and that is induced within the reflected signal when the scanning signal is reflected from the marker comprised of electromagnetic radiation absorbing material.

10. The non-transitory computer-readable medium of claim 9, wherein the marker is one of a lane marker and a surface traffic marker.

11. The non-transitory computer-readable medium of claim 9, wherein the instructions identify the marker according to the electromagnetic signature further include instructions to identify the electromagnetic signature as one or more of:

(i) a contrasting region in the roadway that is characterized by a substantially contrasting reflectivity in comparison to surrounding segments of the roadway, and (ii) a phase region in the roadway that is characterized by a defined phase shift relative to the defined characteristics of the scanning signal.

12. The non-transitory computer-readable medium of claim 9, wherein the instructions further include instructions to identify whether a roadway code is present within the marker according to an outlined shape of the electromagnetic signature within the marker and between successive markers along the roadway, and wherein the instructions further include instructions to decode the marker according to a marker schema to provide embedded information of the roadway code as output to the vehicle in response to determining that the marker includes the roadway code.

13. The non-transitory computer-readable medium of claim 9, wherein the instructions include instructions to receive the reflected signal when a surface of the roadway is covered with precipitation, and wherein the radar is an array of radar sensors located within a forward section of the vehicle and oriented toward the surface of the roadway.

14. A method of detecting a marker on a roadway, comprising:

controlling a radar to actively transmit a scanning signal with defined characteristics including a wavelength within a radar-band of the electromagnetic spectrum that is a non-visible portion of the electromagnetic spectrum, wherein the radar is integrated with a vehicle that is traveling on the roadway; and in response to receiving a reflected signal resulting from the scanning signal interacting with the roadway, identifying the marker from the reflected signal according to an electromagnetic signature of the marker embodied in the reflected signal including identifying the electromagnetic signature according to a contrasting region in the roadway having a contrasting reflectivity of the wavelength in comparison to surrounding sections of the roadway, wherein the electromagnetic signature is a response induced within the defined characteristics of the scanning signal that is embodied within the reflected signal, and wherein the contrasting region is an area with a relatively lower reflectivity for the wavelength within the electromagnetic spectrum than the surrounding sections and that is induced within the reflected signal when the scanning signal is reflected from the marker comprised of electromagnetic radiation absorbing material.

15. The method of claim 14, wherein the marker is one of a lane marker, and a surface traffic marker, wherein the scanning signal and the reflected signal are electromagnetic radiation, wherein identifying the marker according to the electromagnetic signature includes identifying the electromagnetic signature as one or more of:

(i) a contrasting region in the roadway that is characterized by a highly contrasting reflectivity in comparison to surrounding sections of the roadway, and (ii) a phase region in the roadway that is characterized by a defined phase shift as a response produced in the reflected signal relative to the defined characteristics of the scanning signal.

16. The method of claim 15, wherein identifying the marker includes (i) analyzing the reflected signal to locate the contrasting region within the roadway, and (ii) determining whether a shape of the contrasting region correlates with a type of the marker and an expected location within the roadway.

17. The method of claim 14, further comprising:

identifying whether a roadway code is present within the marker according to an outlined shape of the electromagnetic signature within the marker and between successive markers along the roadway.

18. The method of claim 17, wherein identifying whether the roadway code is present includes decoding the marker according to a marker schema to provide embedded information of the roadway code as output to the vehicle in response to determining that the marker includes the roadway code.

19. The method of claim 17, wherein the roadway code is one of: a barcode, a binary code, a ternary code, and a QR code, and wherein identifying the marker includes determining whether a determined shape, area, and electromagnetic signature to satisfy a marker threshold, wherein identifying the marker includes determining whether the determined shape, area, and electromagnetic signature satisfy a marker threshold that indicates a confidence interval for accepting the determined shape, area, and electromagnetic signature as indicating a presence of the marker.

20. The method of claim 17, further comprising:

controlling the vehicle according to the identified marker and associated embedded information, wherein the embedded information includes information about the roadway, and wherein controlling the vehicle includes autonomously controlling the vehicle.

* * * * *